(12) United States Patent
Sato

(10) Patent No.: US 7,209,965 B2
(45) Date of Patent: Apr. 24, 2007

(54) IMAGE PROCESSING APPARATUS, IMAGE PROCESSING METHOD AND CONTROL PROGRAM

(75) Inventor: Eiichi Sato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 847 days.

(21) Appl. No.: 10/308,067

(22) Filed: Dec. 3, 2002

(65) Prior Publication Data

US 2003/0135571 A1    Jul. 17, 2003

(30) Foreign Application Priority Data

Dec. 3, 2001   (JP) .............................. 2001-369138
Nov. 26, 2002  (JP) .............................. 2002-342852

(51) Int. Cl.
    *G06F 15/173*    (2006.01)
(52) U.S. Cl. ...................... 709/224; 709/217; 709/206
(58) Field of Classification Search ................ 709/206, 709/220, 224, 217
    See application file for complete search history.

(56) References Cited

U.S. PATENT DOCUMENTS 6,522,421 B2*   2/2003  Chapman et al. .......... 358/1.15
6,622,266 B1*   9/2003  Goddard et al. ............... 714/44
6,666,594 B2*  12/2003  Parry .......................... 400/74
2001/0003827 A1*  6/2001  Shimamura ................. 709/206
2002/0154328 A1  10/2002  Sato ......................... 358/1.13
2003/0063309 A1*  4/2003  Parry ....................... 358/1.15

FOREIGN PATENT DOCUMENTS

| JP | 10-207670 | * | 8/1998 |
| JP | 11-212891 | * | 8/1999 |
| JP | 11-305978 | * | 11/1999 |
| JP | 2000-029807 | * | 1/2000 |
| JP | 2000-066972 |   | 3/2000 |
| WO | WO 2001-048615 |   | 7/2001 |

* cited by examiner

*Primary Examiner*—Philip B. Tran
(74) *Attorney, Agent, or Firm*—Fitzpatrick, Cella, Harper & Scinto

(57) ABSTRACT

Disclosed herein as a preferred embodiment is an image forming apparatus for printing data requested to be printed from a client apparatus via a network. The image forming apparatus comprising determination means for determining whether or not an instruction string is described in the body portion of e-mail sent from the client apparatus and controlling means for, in the case where the determination means determines that the instruction string is described, printing the data contained in an attached file according to the instruction string. And a control program, a method and a system for controlling these are also disclosed.

23 Claims, 19 Drawing Sheets

FIG. 5

| COMMAND | OPTION | ARGUMENT | DESCRIPTION |
|---|---|---|---|
| print | f | File Name | PRINT THE ATTACHMENT SPECIFIED BY THE ARGUMENT |
|  | all |  | PRINT ALL THE ATTACHMENTS |
| transfer | a | Printer Name | TRANSFER IMAGE DATA TO A PRINTER SPECIFIED BY THE ARGUMENT |
|  | e | Printer Name | TRANSFER IMAGE DATA, NOT PRINTED, TO A PRINTER SPECIFIED BY THE ARGUMENT |
| mailto | a | E-mail Address | SEND MAIL TO AN E-MAIL ADDRESS SPECIFIED BY THE ARGUMENT |
|  |  | EndMsg | SEND A PRINTING COMPLETION MESSAGE BY E-MAIL |
|  |  | ErrMsg | SEND AN ERROR MESSAGE BY E-MAIL |
|  | m | "CHARACTER STRING" | SEND A CHARACTER STRING SPECIFIED BY THE ARGUMENT BY E-MAIL |
| put | f | File Name | SAVE THE ATTACHED FILE SPECIFIED BY THE ARGUMENT IN THE STORAGE MEDIUM |
|  | n | Box Number | SPECIFY THE BOX NUMBER TO SAVE THE FILE |
|  | p | Password | SPECIFY A PASSWORD TO READ THE SAVED FILE |

IMAGE PROCESSING APPARATUS, IMAGE PROCESSING METHOD AND CONTROL PROGRAM

BACKGROUND OF THE INVENTION

1. Field of the Invention

The present invention relates to a printing control technology for an image forming apparatus such as a printer on a network to perform printing based on an instruction from a client apparatus.

2. Related Background Art

In the past, there were printers for receiving e-mail via a network, extracting a script for performing printing if it exists in the received e-mail, and performing the printing by executing the script as described in Japanese Patent Application Laid-Open No. 11-212891. However, such a script did not allow a process to be flexibly described. In addition, as for the scripts, there were a save command for storing printing data on a printing apparatus, a printing command and so on. Nevertheless, there has been no configuration so far, wherein an image processing apparatus attached to the e-mail flexibly performs various processes by using information included in the e-mail.

SUMMARY OF THE INVENTION

The present invention has been implemented in order to solve at least one of the above-mentioned problems, and one of the aspects thereof is to provide an image processing apparatus and a system capable of flexibly describing and processing a script.

In addition, it is another aspect of the present invention to provide a mechanism wherein the image processing apparatus attached to e-mail determines an attached file and performs various processes based on the script.

Furthermore, the following configuration will be disclosed as one aspect of the present invention. For instance, an image forming apparatus for printing data requested to be printed from a client apparatus via a network will be disclosed. This apparatus is the image forming apparatus having determination means for determining whether or not an instruction string is described in the body portion of the e-mail sent from the above described client apparatus and controlling means for, in the case where the above described determination means determines that the above described instruction string is described, printing the data stored in the above described attached file according to the instruction string. In addition, a method controlling program applicable to these apparatuses will also be disclosed.

Other features and advantages of the present invention will be apparent from the following description taken in conjunction with the accompanying drawings, in which like reference characters designate the same or similar parts throughout there of. The invention described in this specification merely shows one aspect, which should not be limitedly interpreted in any case as far as it does not deviate from the import of the present invention.

BRIEF DESCRIPTION OF THE DRAWINGS

FIG. 5 is a diagram showing a format of a control statement which can be inputted by an operator;

DETAILED DESCRIPTION OF THE PREFERRED EMBODIMENTS

Figure 11:
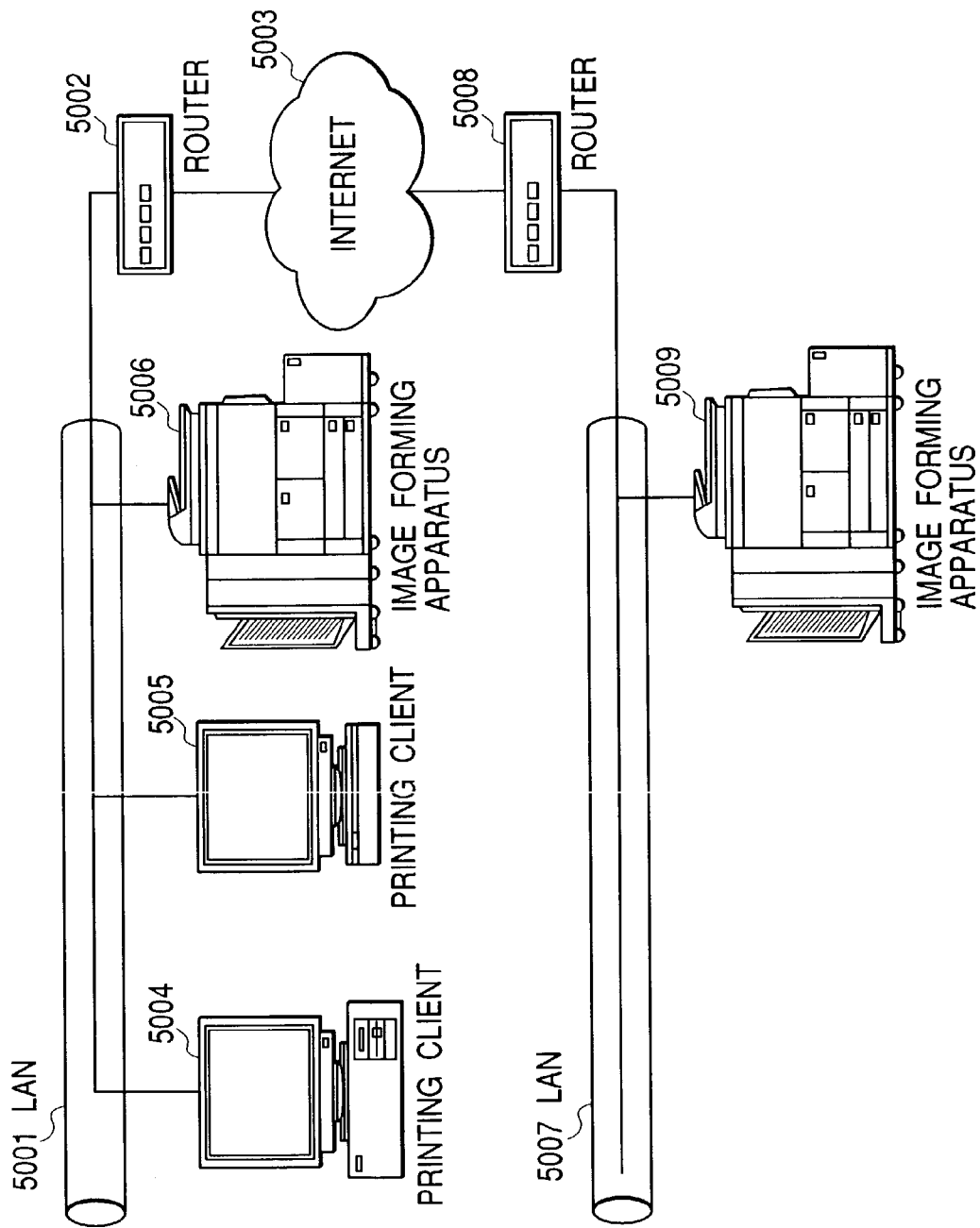
FIG. 11 is a system configuration diagram of the image forming system.

First, an image forming system which can be a precondition for the present invention will be described. FIG. 11 is a system configuration diagram of the image forming system.

In FIG. 11, reference numeral 5001 denotes a first LAN (Local Area Network), 5002 denotes a first router for connecting LANs of different segments, relaying a data packet and performing filtering and so on, 5003 denotes the Internet, 5004 and 5005 denote printing clients which are computer apparatuses, 5006 denotes a first image forming apparatus connected to the first LAN 5001, 5007 denotes a second LAN separated from the first LAN 5001 by a router, 5008 denotes a second router, and 5009 denotes a second image forming apparatus connected to the second LAN 5007.

While it is thinkable that each of the LANs 5001 and 5007 has a plurality of computer apparatuses which can be the printing clients, printer apparatuses which are the image forming apparatuses, server computer apparatuses, relay apparatuses such as a repeater and a hub for constituting a network and so on connected thereon in addition to the above, they are omitted in the description here.

[First System Configuration Example]

As a first system configuration example, a procedure by which the printing client 5004 generates PDL (Page Description Language) printing data by using an existing printing protocol and prints it on the first image forming apparatus 5006 will be described.

Figure 12:
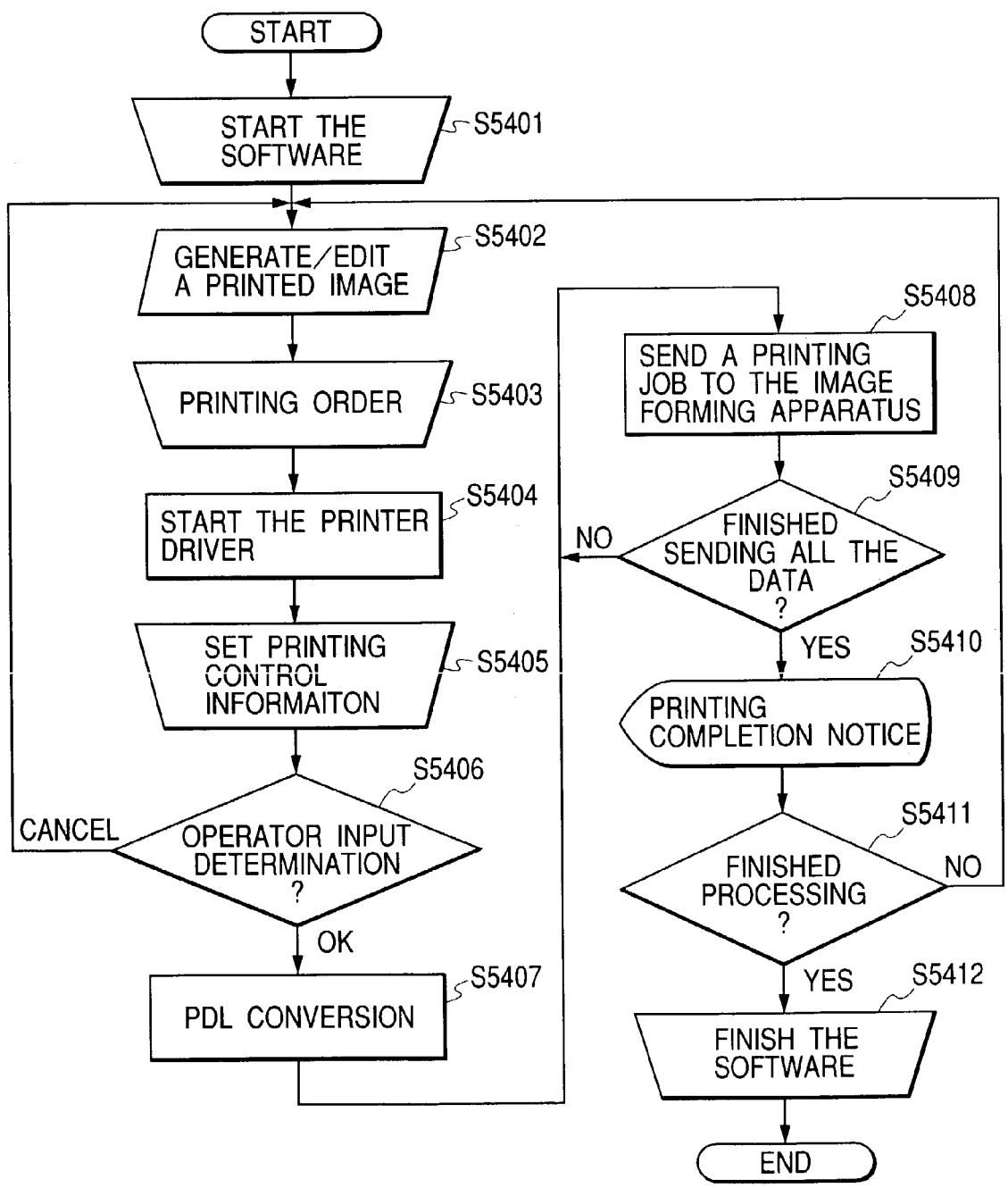
FIG. 12 is a flowchart showing a first example of the printing process of the image forming apparatus.

First, the procedure of sending a print job from the printing client 5004 to the first image forming apparatus 5006 will be described by using a flowchart in FIG. 12.

The printing client 5004 is a computer apparatus having a function of connecting to the first LAN 5001 by an NIC (Network Interface Card) and so on, and has at least one piece of software for processing or generating the data to be printed installed therein.

Figure 13:
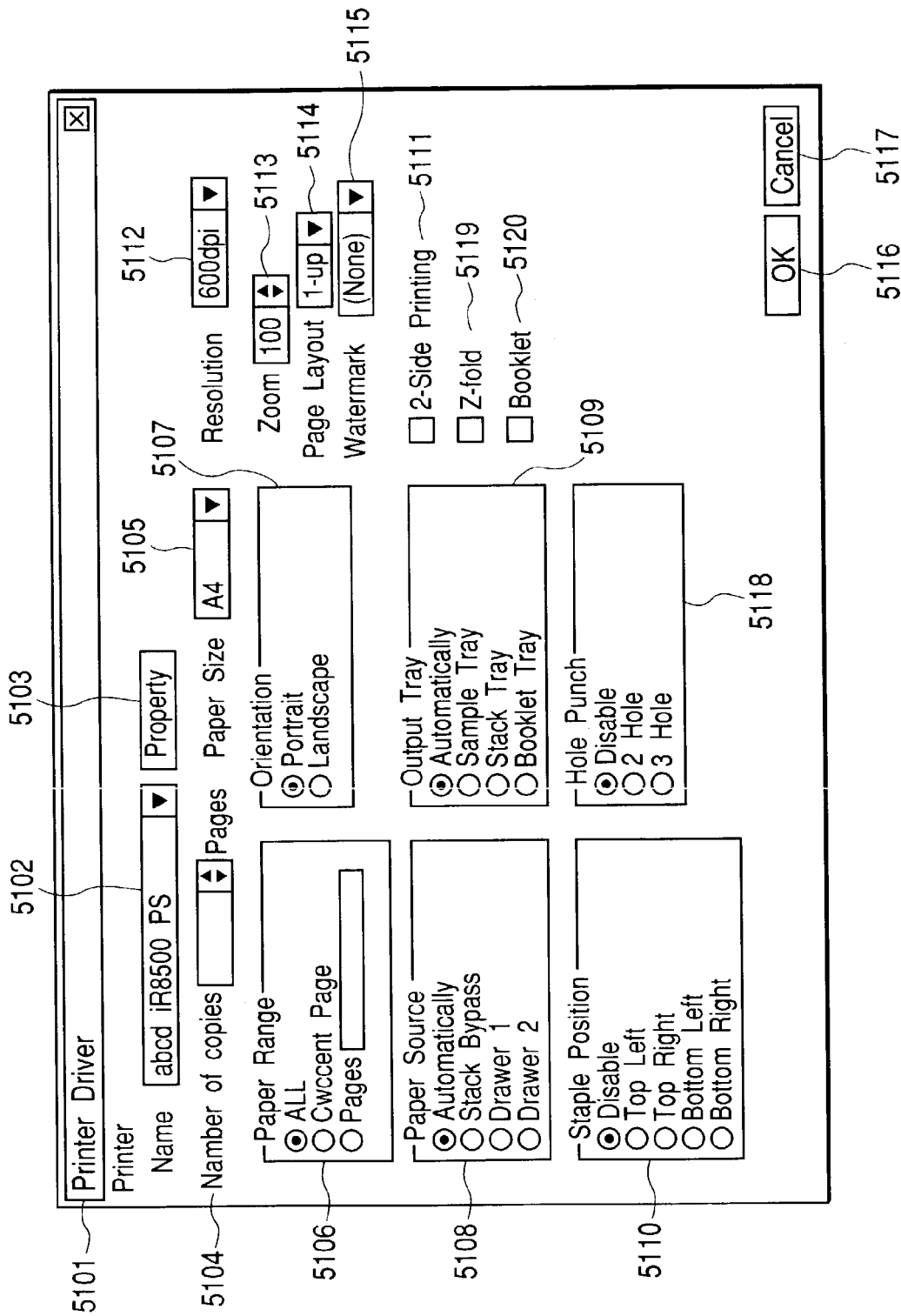
FIG. 13 is a diagram showing an example of a printing control screen by a printer driver.

An operator operates the printing client 5004, starts the software in a step S5401, and generates and edits the data to be printed in a step S5402. If the data to be printed is thus prepared, the operator orders the printing to be started from the software being started in a step S5403. On receiving this printing order, the software activates a printer driver in a step S5404, and displays a screen for prompting the operator to set printing control. FIG. 13 shows an example of the printing control setting screen implemented by the printer driver.

In FIG. 13, reference numeral 5101 denotes a window screen provided by the printer driver, 5102 denotes a GUI (Graphic User Interface) for selecting a printer to be a printing subject, 5103 denotes a Property button for displaying detailed information on the selected printer, 5104 denotes the GUI for specifying the number of sheets to be printed, 5105 denotes the GUI for specifying a size of paper to be printed, 5106 denotes the GUI for specifying a range of pages to be printed, 5107 denotes the GUI for specifying an orientation of the paper to be printed, 5108 denotes the GUI for specifying a place for feeding the paper to be printed, 5109 denotes the GUI for specifying a place for ejecting printed paper, 5110 denotes the GUI for specifying a position for fixing a staple with a stapler.

In addition, 5111 denotes the GUI for specifying whether to print on both sides or on one side, 5112 denotes the GUI for specifying a resolution for printing, 5113 denotes the GUI for specifying a scale factor for printing, 5114 denotes the GUI for specifying a page layout, 5115 denotes the GUI for specifying a watermark and so on, 5116 denotes an OK button for starting the printing, 5117 denotes a Cancel button for stopping the printing, 5118 denotes the GUI for specifying a punching operation for filing, 5119 denotes the GUI for performing control to eject printing paper by folding it like a character Z, and 5120 denotes the GUI for controlling implementation of bookmaking printing.

In a step S5405, the operator sets printing control information by using various GUIs shown in FIG. 13 provided by the printer driver, and presses the OK button 5116, when intending to perform the printing, to have the software start the printing. And when having no intention to perform the printing, the Cancel button 5117 is pressed to have the software finish the printer driver. The operator's intention is determined by an operator input determination in a step S5406, and if determined as a cancel, the software immediately closes a window of the printer driver and returns to the step S5402 to redisplay an editing screen of the data to be printed.

In addition, if determined as OK by the operator input determination in the step S5406, it performs PDL (Page Description Language) conversion for converting the data to be printed into a data format interpretable by the image forming apparatus such as PS (PostScript: a trademark of Adobe Systems) for instance in a step S5407. Thus, the image data to be printed becomes a print job, and is sent to the first image forming apparatus 5006 in a step S5408. At this time, between the printing client 5004 and the first image forming apparatus 5006, a TCP/IP (Transmission Control Protocol/Internet Protocol) is used as a communications protocol, and an LPD (Line Printer Daemon) protocol is used as a printing protocol, for instance. As the LPD protocol is described in detail in RFC 1179, the description thereof will be omitted here.

The printing client 5004 for sending the print job by using arbitrary communications protocol and printing protocol checks, by a minimum transfer block, whether or not sending of all the data has been finished in a step S5409, and in the case where it has not been finished, it returns to the step S5408 and sends a next transfer block. In the case where it determines that the sending of all the data has been finished in the step S5409, it displays the window for notifying the operator that the printing has been finished and also displays the GUI for prompting a determination as to whether to finish or continue the process in a step S5410. This determination is made in a step S5411, and in the case of continuing the process, it returns to the step S5402 and redisplays the editing screen of the data to be printed. And in the case of finishing the process, the software is finished in a step S5412.

Next, the procedure by which the first image forming apparatus 5006 receives the print job sent from the printing client 5004 and prints an image on the printing paper based on the received data will be described by using a block diagram in FIG. 2, a flowchart in FIG. 14, a sectional view showing a mechanical configuration of a black and white image forming apparatus in FIG. 9 and a sectional view showing a mechanical configuration of an ejection apparatus in FIG. 10.

Figure 2:
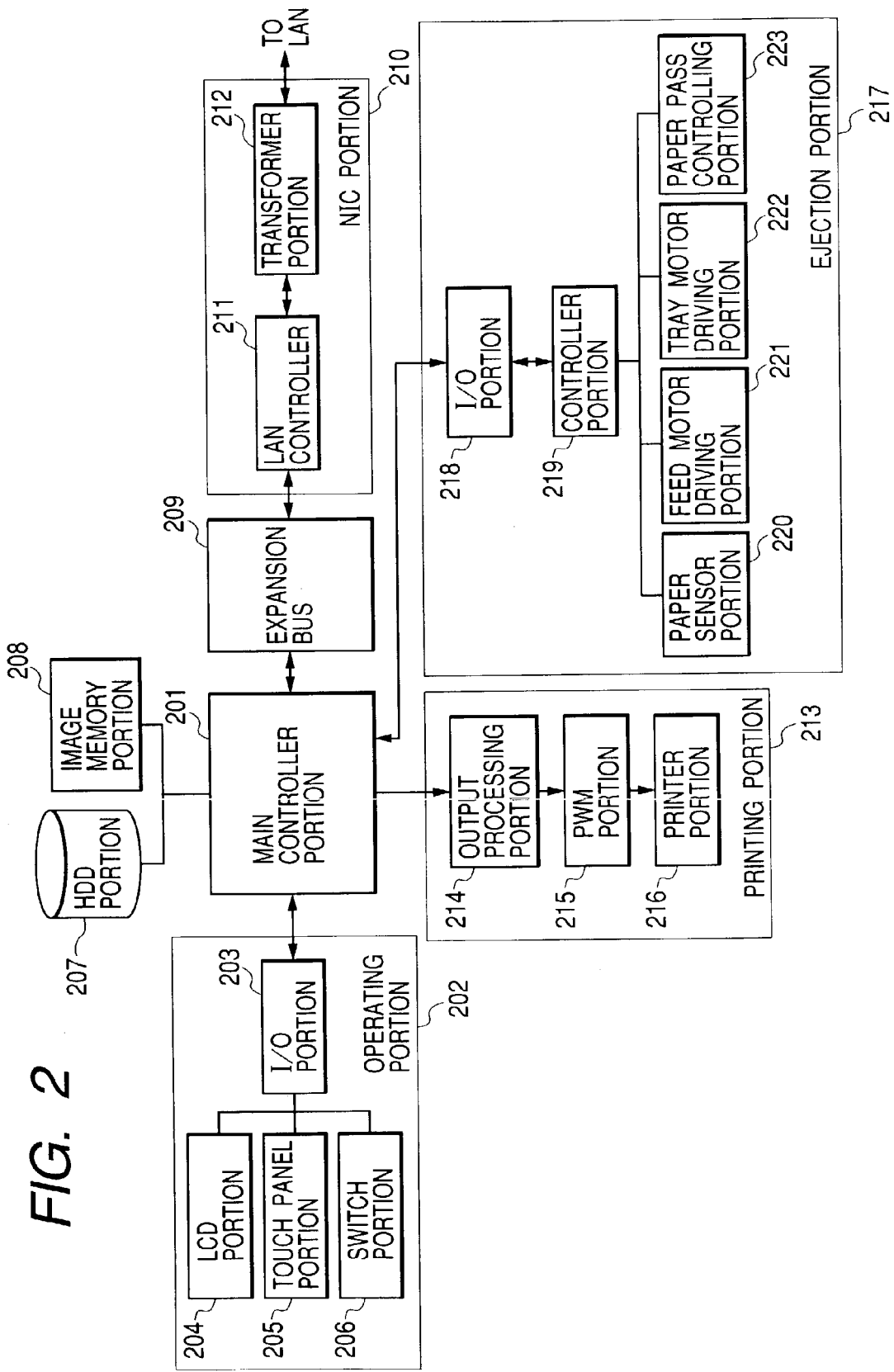
FIG. 2 is a block diagram showing an electrical configuration of an image forming apparatus.

FIG. 2 is a block diagram showing an electrical configuration of the first image forming apparatus 5006. In FIG. 2, reference numeral 201 denotes a main controller portion for controlling the entire first image forming apparatus 5006, 202 denotes an operating portion for having the first image forming apparatus 5006 operated by the operator, 203 denotes an I/O portion for performing communication between the operating portion 202 and the main controller portion 201, 204 denotes an LCD portion for providing information to the operator and displaying a virtual switch, 205 denotes a touch panel portion for detecting the operation of the virtual switch displayed on the LCD portion 204, and 206 denotes a switch portion physically placed for the operator to perform the operation.

In addition, reference numeral 207 denotes an HDD portion for storing the printing data and programs and being used as a cache area of the data, 208 denotes an image memory portion for expanding and processing a printed image, 209 denotes an expansion bus for being used for the purpose of performing feature expansion of the first image forming apparatus 5006, 210 denotes an NIC (Network Interface Card) portion added to the first image forming apparatus 5006 by using the expansion bus 209, 211 denotes an LAN controller for performing control for the sake of supervising a communication packet flowing on the first LAN 5001, taking in only the information related to the first image forming apparatus 5006 and sending the packet created by the first image forming apparatus 5006 to the first LAN 5001, 212 denotes a transformer portion for performing voltage conversion and implementing physical communication between the first image forming apparatus 5006 and the first LAN 5001, and 213 denotes a printing portion for printing the image on the printing paper which is a record medium.

In addition, 214 denotes an output processing portion for performing the processes such as gamma conversion, edge enhancement and smoothing in order to correct image data sent by the main controller portion to be the data suitable for printing on the printing paper, 215 denotes a PWM portion for converting the image data after the output processing into a signal for driving a laser beam, and 216 denotes a printer portion for printing the image on the printing paper based on the signal provided by the laser beam.

217 denotes an ejection portion for ejecting the printed printing paper created by the printing portion 213 to the outside of the first image forming apparatus 5006, 218 denotes the I/O portion for performing communication between the ejection portion 217 and the main controller portion 201, 219 denotes a controller portion for controlling the ejection portion 217, 220 denotes a paper sensor portion for supervising a flow of the printing paper passing through the inside of the ejection portion 217, 221 denotes a feed motor driving portion for driving a motor for delivering the printing paper, and 222 denotes a tray motor driving portion for driving an ejection tray, and 223 denotes a paper pass controlling portion for controlling the flow of the printing paper.

Figure 9:
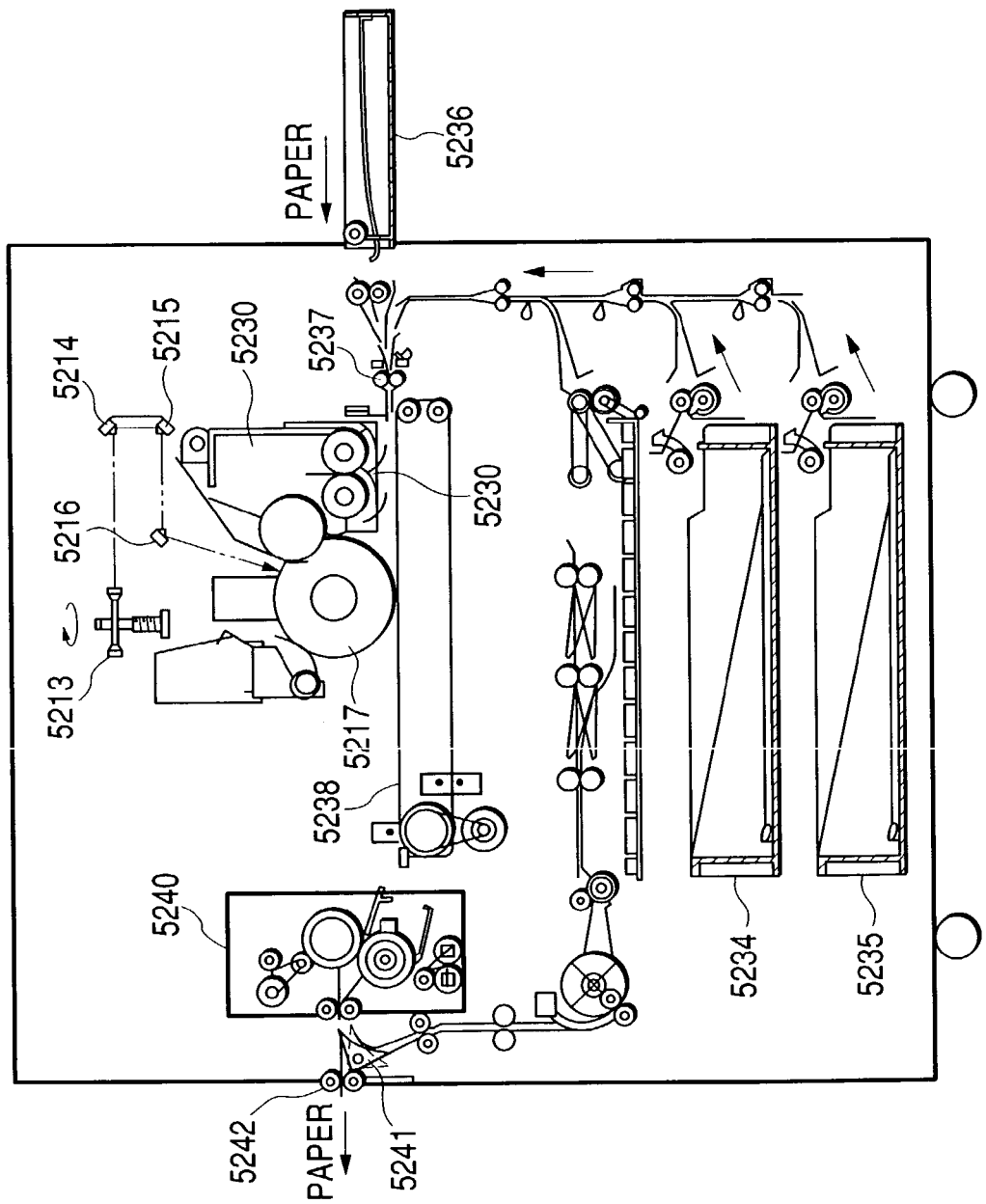
FIG. 9 is a sectional view showing a mechanical configuration of a black and white image forming apparatus.

FIG. 9 is a sectional view showing a mechanical configuration of the first image forming apparatus 5006 capable of printing a black and white image.

In FIG. 9, 5213 denotes a polygon mirror, 5214, 5215 and 5216 denote mirrors, 5217 denotes a photoconductive drum for forming a toner image based on a laser beam, 5230 denotes a development apparatus for supplying a black toner, 5234 and 5235 denote paper cassettes for feeding the printing paper, 5236 denotes a manual tray for manually feeding the printing paper, 5237 denotes a resist roller, 5238 denotes a transcription belt, 5240 denotes a fixing apparatus, 5241 denotes a flapper for controlling the flow of the printing paper, and 5242 denotes an ejection roller for controlling the ejection of the printing paper.

Figure 10:
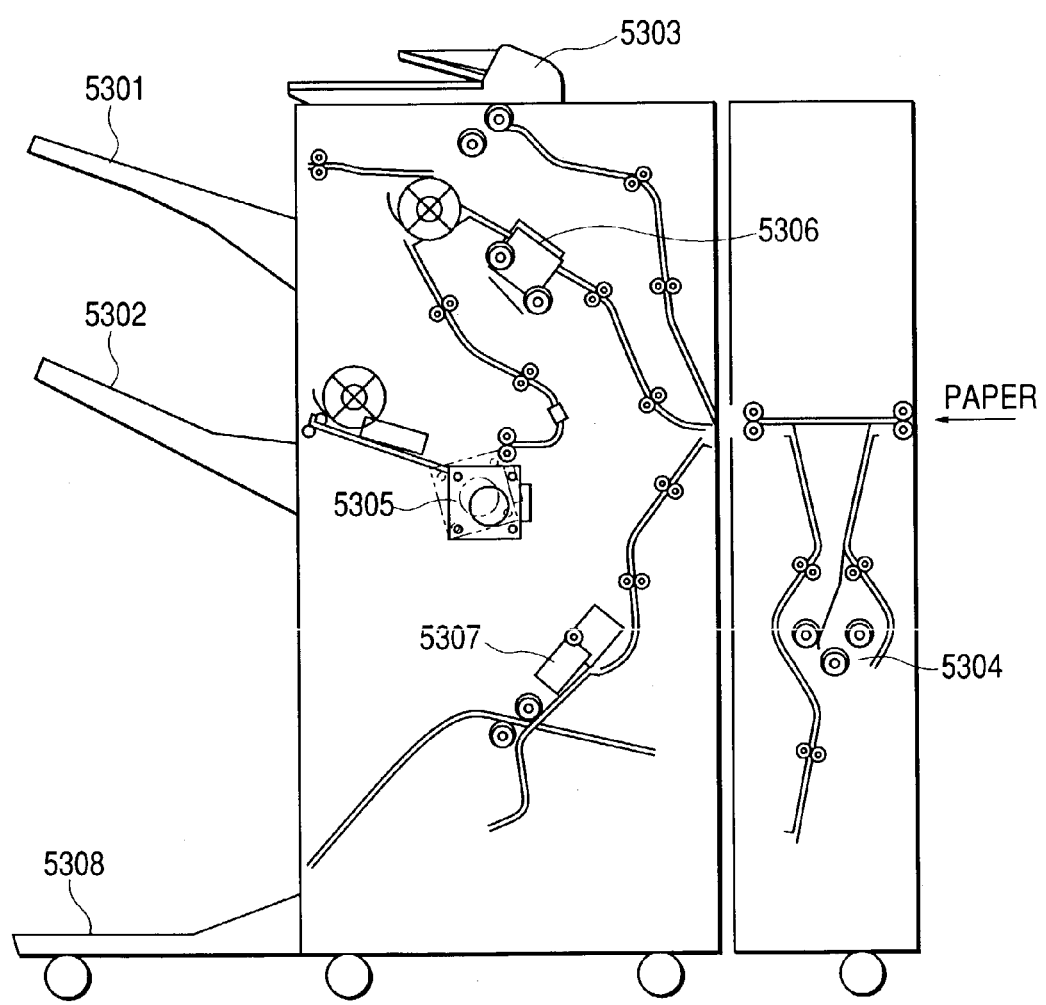
FIG. 10 is a sectional view showing a mechanical configuration of an ejection apparatus.

FIG. 10 is a schematic view showing a mechanical configuration of an ejection portion 5517. In FIG. 10, 5301 denotes a sample tray for ejecting the printing paper, 5302 denotes a stack tray for ejecting the printing paper, 5303 denotes an inserter for the purpose of inserting the printing paper, 5304 denotes a Z folding apparatus which is an apparatus for folding the printing paper, 5305 denotes a stapler for binding the printing paper, 5306 denotes a puncher for punching a hole for filing, 5307 denotes a saddle stitcher for converting the printing paper into a booklet form, and 5308 denotes a booklet tray for ejecting the printing paper converted into the booklet form.

Figure 14:
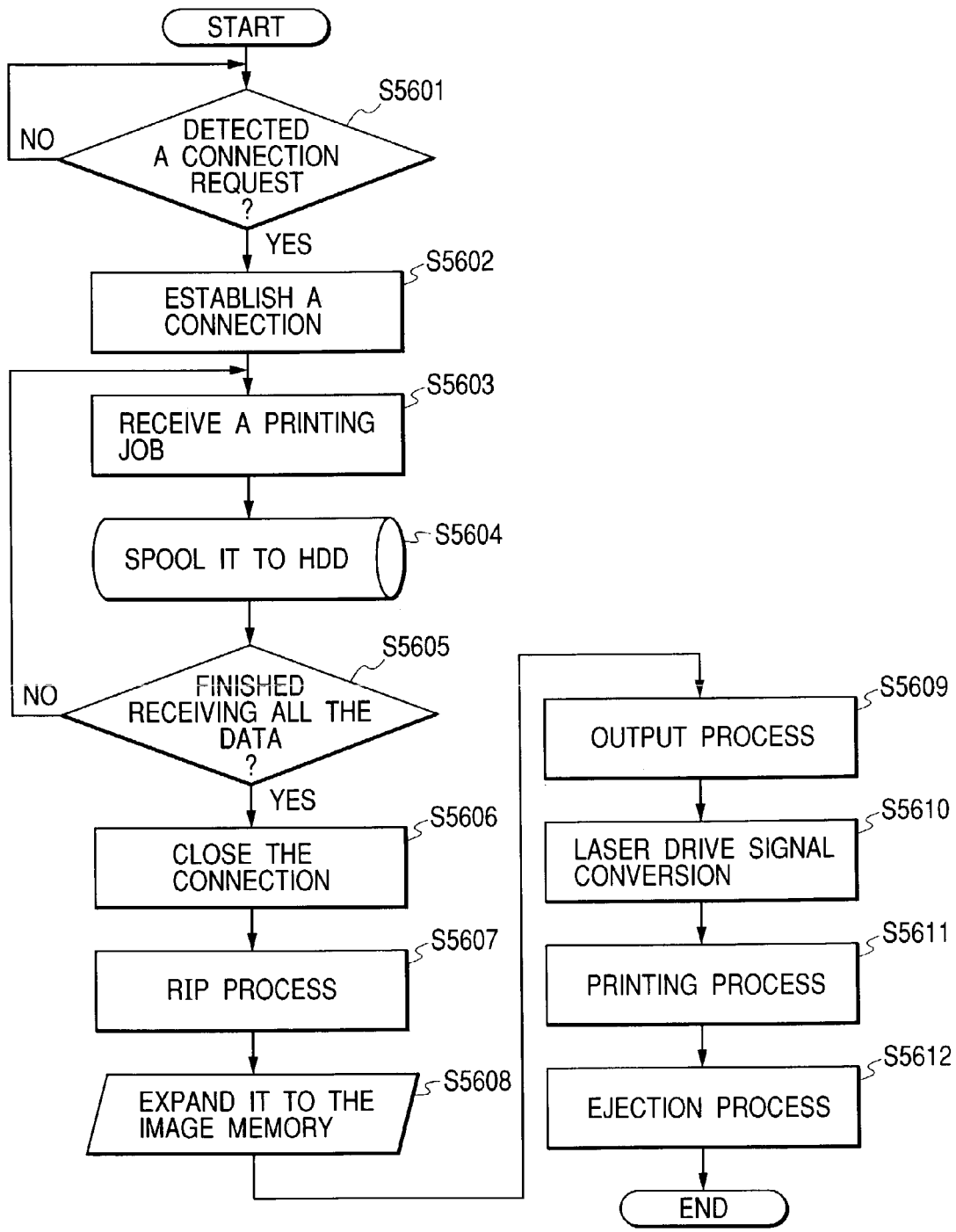
FIG. 14 is a flowchart showing the first example of the printing process of the image forming apparatus.

FIG. 14 is a flowchart showing the procedure by which the first image forming apparatus 5006 receives the print job sent from the printing client 5004 and prints the image on the printing paper based on the received data.

In the case where the printing client 5004 performs the communication with the first image forming apparatus 5006 via the first LAN 5001, the TCP/IP protocol is used as the communications protocol for instance. As the communication using the TCP/IP protocol requires a connection to be established between two hosts before starting data communication, the printing client 5004 sends a connection request (a TCP segment of which SYN bit is on) to the first image forming apparatus 5006. This connection request is taken into the first image forming apparatus 5006 from the NIC portion 5510 via the first LAN 5001.

In the NIC portion 5510, the voltage conversion of received data is performed by the transformer portion 5512 at first, and it is sent to the LAN controller 5511. The LAN controller 5511 monitors this connection request in a step S5601, and in the case where the connection request is detected, it establishes the connection in a step S5602 according to a formal procedure prescribed in the TCP/IP protocol. If the connection is thus established between the two points of the printing client 5004 and the first image forming apparatus 5006, the printing client 5004 sends the print job to the first image forming apparatus 5006 by using an LPD protocol which is one of the printing protocols for instance.

The print job using the LPD protocol is sent from the printing client 5004 to the first image forming apparatus 5006 by using a port number 515 of the TCP/IP protocol. The first image forming apparatus 5006 sends the print job sent by the LPD protocol to the main controller portion 5501 from the NIC portion 5510 via the expansion bus 5509.

On determining that this received data is the print job, the main controller portion 5501 spools the data being received to the HDD portion 5507 once in a step S5604 while receiving the print job in a step S5603, and determines whether or not receiving of all the data has been finished in a step S5605. At this time, in the case where it has not been finished, it returns to the step S5603 and repeats the steps S5603 to S5605. In the case where it determines that the receiving of all the data has been finished in the step S5605, however, the main controller portion 5501 orders the LAN controller 5511 of the NIC portion 5510 to close the connection.

On receiving this order, the LAN controller 5511 closes the connection in a step S5606 in compliance with the normal procedure stipulated in the TCP/IP protocol. If the receiving of the print job sent from the printing client 5004 is finished, the main controller 5501 reads the print job spooled in the HDD portion 5507. The read data is in a state of a page-description language called PDL (Page Description Language) and cannot be handled as the printing data as-is so that a RIP (Raster Image Processing) process is performed to convert the PDL data into raster image data in a step S5607.

The data which has thus become the raster image data is once expanded to the image memory 5508 in a step S5608, and the output processes such as the gamma conversion, edge enhancement and smoothing are performed thereto by the output processing portion 5514 of the printing portion 5513 in order to correct it to be the data suitable for printing on the printing paper (step S5609). The image data which has been thus converted into the data suitable for printing is converted into the laser driving signal by the PWM portion 5515 (step S5610) and then sent to the printer portion 5516.

In the printer portion 5516, the printing process for printing the image from the laser driving signal to the printing paper (step S5611) is performed. This printing process will be described in detail based on FIG. 9.

In FIG. 9, 5213 denotes the polygon mirror, which receives the laser beam. The laser beam is irradiated to the photoconductive drum 5217 via the mirrors 5214, 5215 and 5216, and scans the photoconductive drum 5217 by rotation of the polygon mirror 5213. On the other hand, 5230 denotes the development apparatus for supplying the black toner, forms the toner image on the photoconductive drum 5217 according to the laser beam, and the toner image is transcribed to the printing paper so that an output image can be obtained.

The printing paper fed by one of the paper cassettes 5234 and 5235 and the manual tray 5236 is absorbed on the transcription belt 5238 and carried by way of the resist roller 5237. A toner is developed in the photoconductive drum 5217 in advance in synchronization with timing of the feed, and the toner is transcribed to the printing paper in conjunction with carriage thereof. The printing paper to which the toner is transcribed is separated from the transcription belt 5238, and the toner is fixed on the printing paper by the fixing apparatus 5240 so as to be ejected to the outside of the first image forming apparatus 5006 by the ejection roller 5242.

In the case of printing on both sides, however, the printing paper is carried to the ejection roller 5242, and then the rotating direction of the ejection roller 5242 is reversed so as to have it led to a refeed carriage route by the flapper 5241. In addition, in the case of performing multiple recording, the printing paper is led to the refeed carriage route by the flapper 5241 so as not to carry it to the ejection roller 5242. The printing paper led to the refeed carriage route is fed from the resist roller 5237 in the above-mentioned timing so that the process of printing the image on the printing paper is performed again.

If the printing process of the image data is thus finished, the printed printing paper is sent to the ejection portion 5517, where an ejection process (step S5612) is performed. The ejection portion 5517 controls various ejection processes as the controller portion 5519 for controlling the ejection apparatus performs the communication with the main controller 5501 via the I/O portion 5518. On the other hand, the controller portion 5519 delivers the printing paper by using the feed motor driving portion 5521, controls the flow of the printing paper by using the paper pass controlling portion 5523, and controls the tray motor driving portion 5521 to eject the printing paper to an arbitrary tray while supervising the flow of the printing paper by using the paper sensor portion 5520.

FIG. 10 is a sectional view showing a mechanical configuration of the ejection apparatus. In FIG. 10, 5301 denotes a sample tray, 5302 denotes a stack tray, and 5308 denotes a booklet tray, where the tray for ejection is switched by the control of the controller portion 5519 according to the type of job and the number of sheets of the printing paper to be ejected.

The stack tray 5302 allows the printing paper before ejection to be stored for each job and bound by the stapler 5305 immediately before ejection.

In addition, the route through which the printing paper is led to the sample tray 5301 and the stack tray 5302 has the Z folding apparatus 5304 for folding the printing paper like the character Z and the puncher 5306 for punching two or three holes for filing provided thereon, which perform the respective processes according to the type of job.

Moreover, the inserter 5303 is used to perform an insertion function, and the printing paper for the insertion can be placed therein. Furthermore, the saddle stitcher 5307 is used to fold the printing paper in half in the booklet form and bind it at its center. In this case, it is ejected to the booklet tray 5308.

As for the designation of the functions in the ejection portion described above and other designation related to the printing functions such as the number of sheets to be printed and the number of sets to be printed, they are designated by the printer driver implemented on the aforementioned printing client 5004 (refer to FIG. 13).

The information designated here becomes control data, and is sent to the first image forming apparatus 5006 after being implanted in the PDL data on the PDL conversion process described in the step S5407 so that the control data is extracted by the RIP process of the step S5607. Of this control data, the information necessary for forming the image is referred to when expanding the image data to the image memory 5508 in the step S5608 so as to be utilized for forming the image.

On the other hand, of the control data, the information necessary for the process of ejecting the image is passed to the controller portion 5519 of the ejection portion 5517 by the main controller portion 5501, and the controller portion 5519 controls the ejection apparatus based on this information so as to perform the ejection process.

Moreover, while the second image forming apparatus 5009 has the configuration equivalent to that of the aforementioned first image forming apparatus 5006 and has the like capabilities and functions, it is different from the first image forming apparatus in that it is connected to the second LAN separated from the first LAN 5001 by the first router 5002 and the second router 5008.

[Second System Configuration Example]

As a second system configuration example, the procedure by which the printing client 5004 uses a dedicated file downloader and a download protocol to transfer image-formatted image data to the first image forming apparatus 5006 and print it.

Figure 15:
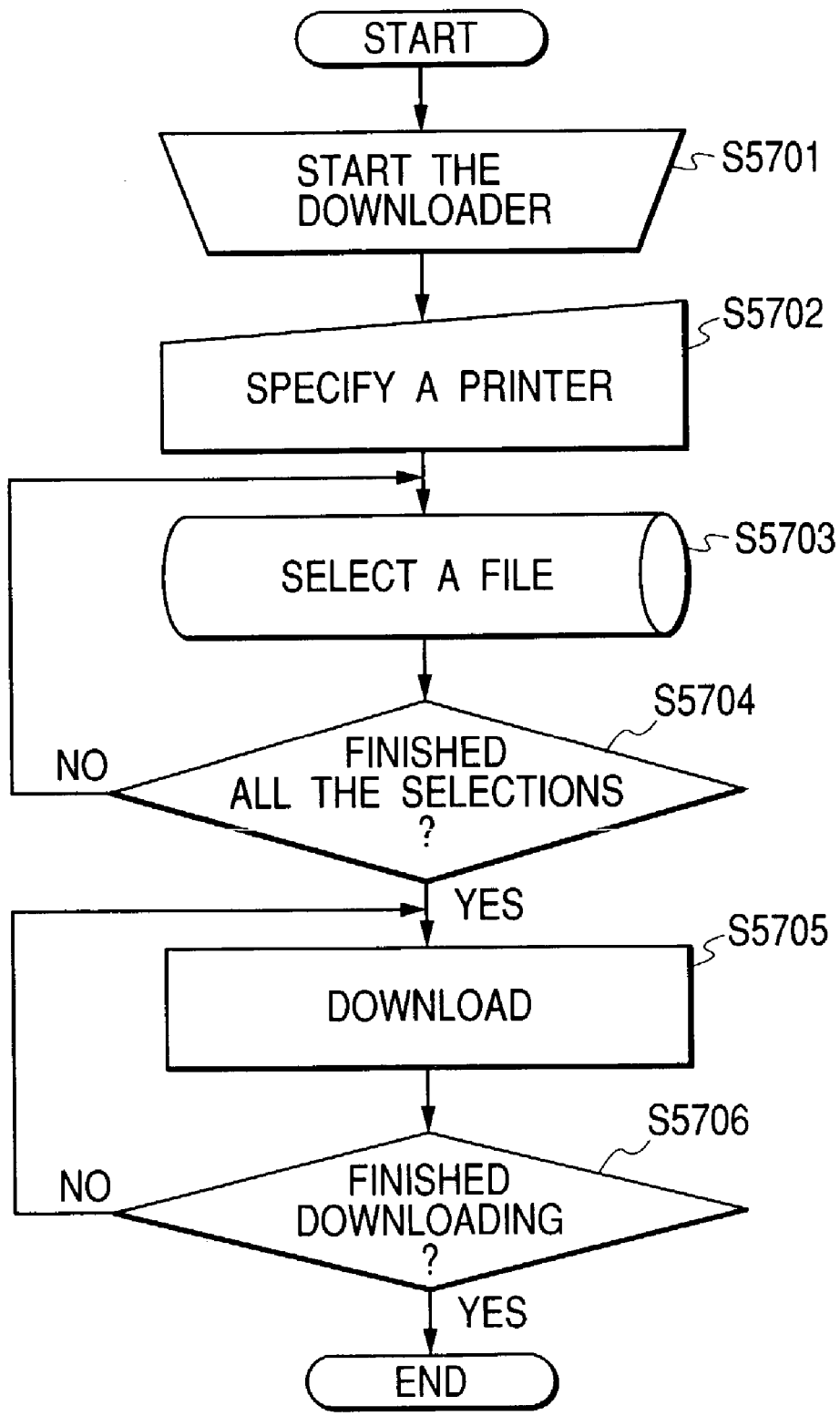
FIG. 15 is a flowchart showing a download process of data of a printing subject on a printing client.

First, the procedure by which the printing client 5004 sends the printing data to the first image forming apparatus 5006 will be described by using the flowchart in FIG. 15.

The printing client 5004 is a computer apparatus having the function of connecting to the LAN 5001 with the NIC (Network Interface Card) and so on, and has a storage medium such as a hard disk for storing the information. In addition, the printing client 5004 can hold the image-formatted image data on that storage medium. For instance, representative image formats are PDF (Portable Document Format: Adobe Systems, USA), TIFF (Tagged Image File Format: Microsoft & Aldus, USA), JPEG (Joint Photographic Experts Group: ISO and ITU joint standard), GIF (Graphics Interchange Format: CompuServe, USA) and so on.

In addition, the printing client 5004 has a dedicated downloader program installed thereon in order to download the image-formatted image data to the first image forming apparatus, and the downloader program is operated by the operator so as to send the image data.

Figure 16:
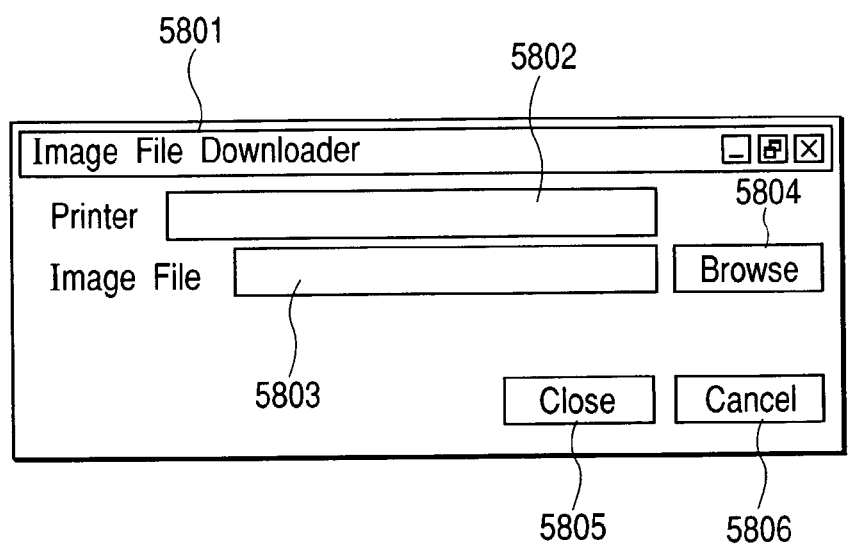
FIG. 16 is a diagram showing the GUI screen of a downloader program.

FIG. 16 shows the GUI of the downloader program. In FIG. 16, 5801 denotes a window screen of an image downloader, 5802 denotes an editing box for entering a printer name, an IP address or the like for downloading the image data, 5803 denotes the editing box for specifying the image data to be downloaded, 5804 denotes a browse button used for browsing the image data from the storage medium, 5805 denotes a close button for closing the window, 5806 denotes a cancel button for canceling an input and closing the window.

The operator operates the printing client 5004, starts the download program in a step S5701, and enters the printer name or IP address in the editing box 5802 so as to specify the image forming apparatus for printing in a step S5702. Subsequently, the operator specifies the file to be downloaded by directly entering the specification thereof in the editing box 5803 or operates the browse button 5804 to identify the image data to be downloaded by referring to the files stored in the storage medium in a step S5703.

As it is also thinkable that a plurality of files are specified, it is determined whether or not selection of all the files has been finished in a step 5704, and in the case where it has not been finished, it returns to the step S5703 and continues the specification of the files. In the case where it thus determines that the selection of all the files has been finished in the step S5704, the printing client 5004 downloads the image data to the first image forming apparatus 5006 by using the dedicated download protocol in a step S5705.

Next, it supervises the end of the download in a step S5706 while the steps S5705 and S5706 are repeated until the download is finished, and if the download of all the data is finished, the downloader finishes its process.

Moreover, as for the technique for the printing client 5004 to download the file to the first image forming apparatus 5006 in the step S5705, it is also possible to perform it by using an FTP (File Transfer Protocol) for instance apart from using the dedicated download protocol. In the case of using the FTP, number 21 is used as a TCP/IP port number. In the case of using the dedicated protocol, however, an arbitrary port is selected from undefined port numbers and is used.

Next, the procedure by which the first image forming apparatus 5006 receives the image data downloaded from the printing client 5004 and prints the image on the printing paper based on the received data will be described mainly by using the flowchart in FIG. 17.

Figure 17:
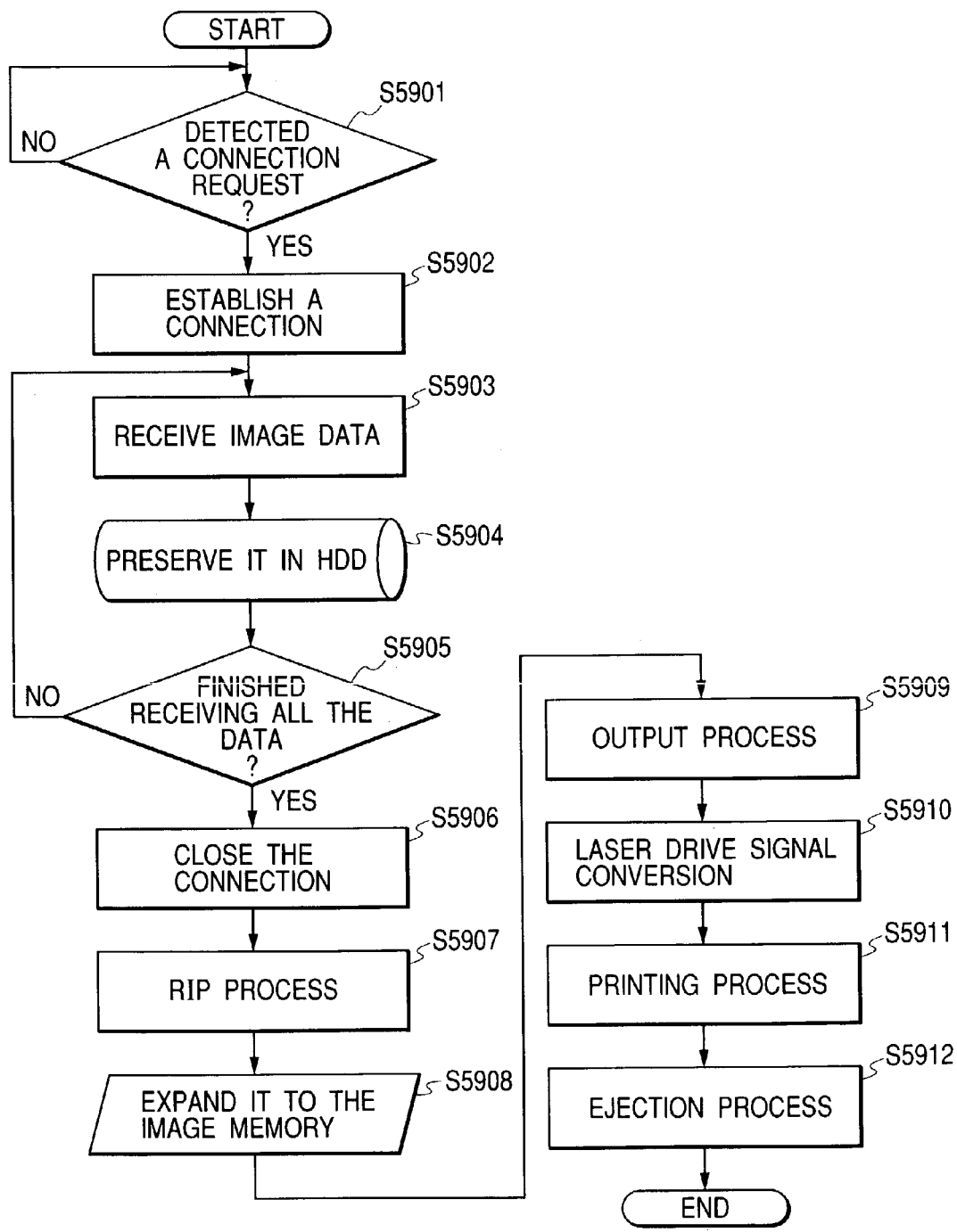
FIG. 17 is a flowchart showing a second example of the printing process of the image forming apparatus.

FIG. 17 is the flowchart showing the procedure by which the first image forming apparatus 5006 receives the image data sent from the printing client 5004 and prints the image on the printing paper based on the received data.

In the case where the printing client 5004 performs the communication with the first image forming apparatus 5006 via the first LAN 5001, the TCP/IP protocol is used as the communications protocol for instance. As the communication using the TCP/IP protocol requires the connection to be established between the two hosts before starting the data communication, the printing client 5004 sends a connection request (a TCP segment of which SYN bit is on) to the first image forming apparatus 5006. This connection request is taken into the first image forming apparatus 5006 from the NIC portion 5510 via the first LAN 5001.

In the NIC portion 5510, the received data has its voltage converted first by the transformer portion 5512, and is sent to the LAN controller 5511. The LAN controller 5511 monitors this connection request in a step S5901, and in the case where the connection request is detected, it establishes the connection in a step S5902 according to the formal procedure prescribed in the TCP/IP protocol. If the connection is thus established between the two points of the printing client 5004 and the first image forming apparatus 5006, the printing client 5004 sends the image data to the first image forming apparatus 5006 by using the dedicated downloader application and download protocol (an existing file transfer protocol such as an FTP protocol may also be used).

In the case of downloading the image data by using the dedicated download protocol, an arbitrary port of undefined ports of the TCP port is selected so as to download the image data from the printing client 5004 to the first image forming apparatus 5006 (in the case of using the FTP, the number 21 of the TCP/IP port is used).

The first image forming apparatus 5006 sends the image data sent by the dedicated download protocol to the main controller 5501 from the NIC portion 5510 via the expansion bus 5509. On determining that this received data is the image data, the main controller 5501 spools the received image data to the HDD portion 5507 once in a step S5904 while receiving the image data in a step S5903, and determines whether or not receiving of all the data has been finished in a step S5905.

At this time, in the case where it is determined that the receiving of all the data has not been finished yet, it returns to the step S5903 and repeats the steps S5903 to S5905. In the case where it is determined that the receiving of all the data has been finished in the step S5905, however, the main controller portion 5501 orders the LAN controller 5511 of the NIC portion 5510 to close the connection. On receiving this order, the LAN controller 5511 closes the connection in a step S5906 in compliance with the normal procedure stipulated in the TCP/IP protocol.

Thus, if the receiving of the print job sent from the printing client 5004 is finished, the main controller 5501 reads the image data stored in the HDD portion 5507. The read data is in a state of the image format such as PDF and cannot be handled as the printing data as-is so that a RIP (Raster Image Processing) process is performed to convert the image format data into raster image data in a step S5907. The data which has thus become the raster image data is once expanded to the image memory 5508 in a step S5908, and the output processes such as the gamma conversion, edge enhancement and smoothing are performed thereto by the output processing portion 5514 of the printing portion 5513 in order to correct it to be the data suitable for printing (step S5909). The image data which has been thus converted into the data suitable for printing is converted into the laser driving signal by the PWM portion 5515 (step S5910) and then sent to the printer portion 5516.

In the printer portion 5516, the printing process for printing the image from the laser driving signal to the printing paper (step S5911) is performed.

As described above, in the case of performing the printing with the LAN as a communication medium, the image forming system related to the first system configuration example performs the data communication for the printing by using the existing printing protocol represented by the LPD, so that the printing can be performed without any problem if the printing client 5004 and the first image forming apparatus 5006 are placed in the same segment not separated by the router.

However, in order for the printing client 5004 to perform the printing to the second image forming apparatus 5009 connected to the second LAN 5007 existing outside the segment beyond the router for instance, there arises a problem of a security policy of each router.

While the most representative role of the router is to relay a packet between the segments, it also has two other roles if roughly divided. One is to manage the flow of the packets so that no extra packet should flow out of the segment to generate extra traffic to another network.

Another role is a filter function, which monitors a network protocol, the TCP/IP port numbers and IP addresses so as to carefully control the packets relayed beyond the segment. To be more specific, in the case where filtering is set by the first router 5002 so that the port number 515 to be used by the LPD which is one of the printing protocols cannot be passed through for instance, the printing client 5004 cannot perform the printing using the LPD protocol to the second image forming apparatus 5009 connected outside the first router 5002.

For instance, in the case where the first router 5002 is the router placed on a contact point between an in-house intranet and the external Internet 5003, there is supposedly little possibility that it is set to pass the existing printing protocol. It is because, from a viewpoint of security, only the essential ports of the router connected to an external network are opened (passed) in general in order to prevent unauthorized access from the outside.

For this reason, a printing protocol called IPP (Internal Printing Protocol) was established recently. This printing protocol allows a port number 80 which is the port for HTTP (Hyper Text Transfer Protocol) and a port number 631 which is the port for IPP to be used. However, the port number 80 is the port for the HTTP, and so the router which is the contact point between the intranet and the outside generally has the filtering performed so as not to have this port number passed in order to prevent leakage of the information from a WWW server installed in the intranet, so that there are many cases where no printing is possible in reality from the outside of the segment.

On the other hand, as for the port number 631, it is easily supposed that there are many routers having this port unopened on the network due to low recognition and low use of the IPP, in which case the printing from the outside of the segment cannot be performed either.

On the other hand, in the case of downloading the image data and performing the printing with the LAN as the communication medium, the image forming system related to the second system configuration example performs the data communication for the printing by using the dedicated download protocol or the existing file transfer protocol such as FTP, so that the printing can be performed without any problem if the printing client 5004 and the first image forming apparatus 5006 are placed in the same segment not separated by the router.

However, in order for the printing client 5004 to perform the printing to the second image forming apparatus 5009 connected to the second LAN 5007 existing outside the segment beyond the router for instance, there arises the problem of the security policy of each router as with the first system configuration example.

To be more specific, in the case where the filtering is set by the first router 5002 so that the port number to be used by the download protocol (or the file transfer protocol) cannot be passed through, the printing client 5004 cannot perform the printing by using the download protocol to the second image forming apparatus 5009 connected outside the first router 5002.

It is because, from the viewpoint of security, there is supposedly little possibility that it is set to allow the undisclosed port number to be passed in the case where the first router 5002 is the router placed on the contact point between the in-house intranet and the external Internet 5003.

Furthermore, in the case of the printing methods described in the first and second embodiments, it is very difficult, when the printing client and the image forming apparatus are installed at physically distant locations, to be aware of an abnormality occurred on the image forming apparatus such as the abnormality indicating that a printing apparatus is incapable of the printing (the printer being offline, a paper jam during the printing and so on) from the printing client side. In addition, it is difficult to get rid of the abnormality and normally terminate the printing even if the abnormality occurred on the image forming apparatus can be known to the printing client side.

Even in a system having the client apparatus and image forming apparatus connected to mutually different networks separated by the router, it is possible to send the data from the client apparatus to have it printed by the image forming apparatus, and instructions can be provided from the client apparatus to the image forming apparatus as to how to respond to the end of the printing and occurrence of the abnormality.

Figure 1:
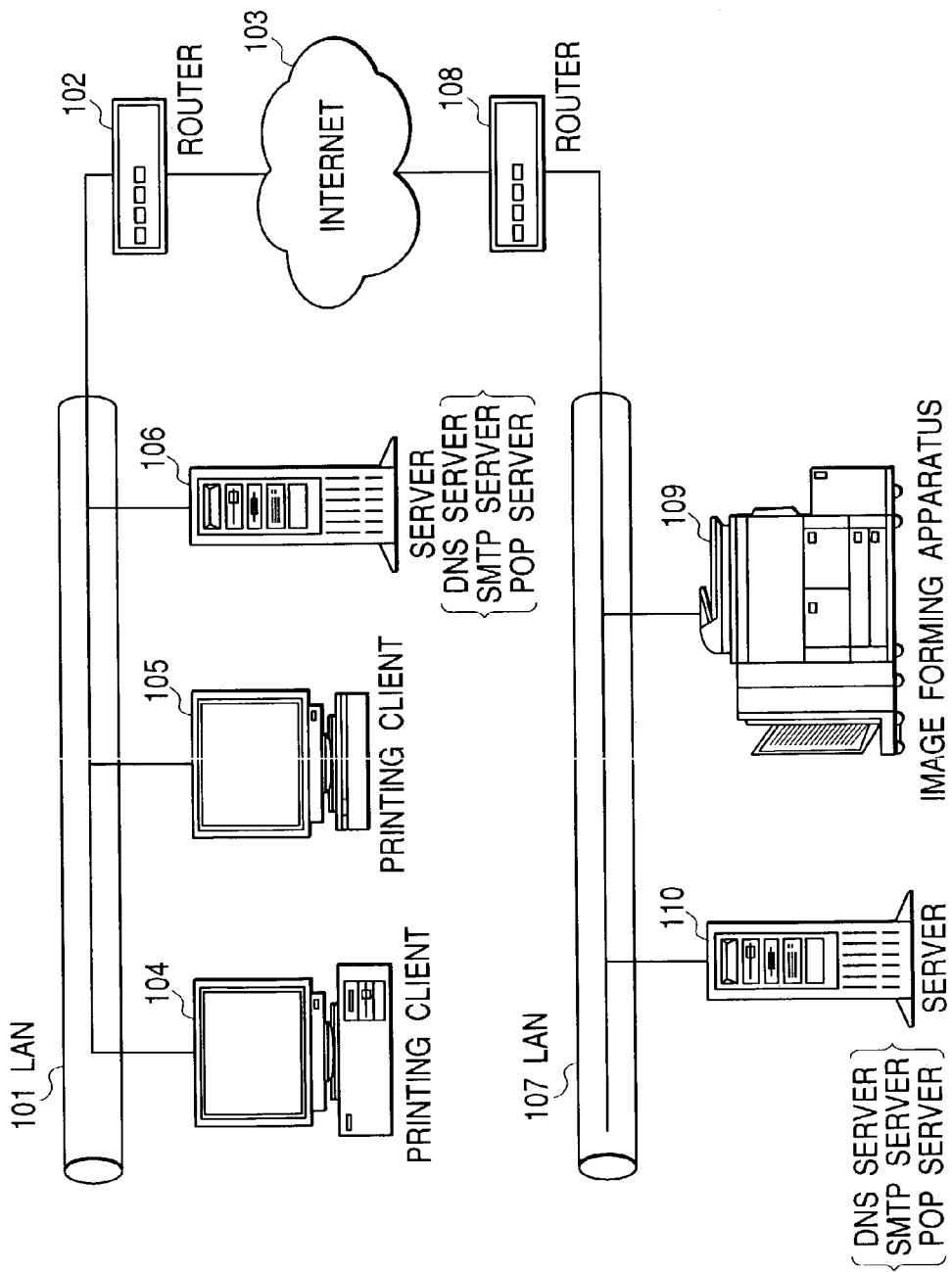
FIG. 1 is a system configuration diagram of an image forming system to which the present invention is applied.

FIG. 1 is a system configuration diagram of the image forming system to which the present invention is applied.

In FIG. 1, reference numeral 101 denotes the first LAN (Local Area Network), 102 denotes the first router for connecting LANs of different segments and performing the relay of data packets and the filtering, 103 denotes the Internet, 104 and 105 denote the printing clients which are the computer apparatuses, 106 denotes a server apparatus for providing a DNS (Domain Name System) service, an SMTP (Simple Mail Transfer Protocol) service, a POP (Post Office Protocol) service and so on, 107 denotes the second LAN separated from the first LAN 101 by the router, 108 denotes the second router, and 109 denotes the image forming apparatus connected to the second LAN 107.

Although it is thinkable that each LAN has a plurality of computer apparatuses which can be the printing clients, the printer apparatuses which are the image forming apparatuses, server computer apparatuses, relay apparatuses such as the repeater and hub for constituting the network and so on connected thereon in addition, they are omitted in the description here.

FIG. 2 is a block diagram showing an electrical configuration of an image forming apparatus 109.

In FIG. 2, reference numeral 201 denotes the main controller portion for controlling the entire image forming apparatus 109, 202 denotes an operating portion for having the image forming apparatus 109 operated by the operator, 203 denotes the I/O portion for performing communication between the operating portion 202 and the main controller portion 201, 204 denotes an LCD portion for providing the information to the operator and displaying a virtual switch, 205 denotes a touch panel portion for detecting the operation of the virtual switch displayed on the LCD portion 204, and 206 denotes a switch portion physically placed for the operator to perform the operation.

207 denotes the HDD portion for storing the printing data and programs and being used as a cache area of the data, 208 denotes an image memory portion used for expanding and processing a printed image, 209 denotes the expansion bus for being used for the purpose of performing feature expansion of the image forming apparatus 109, 210 denotes the NIC (Network Interface Card) portion added to the image forming apparatus 109 by using the expansion bus 209, 211 denotes the LAN controller for performing control for the sake of supervising a communication packet flowing on the first LAN 101, taking in only the information related to the first image forming apparatus 109 and sending the packet created by the image forming apparatus 109 to the first LAN 101, 212 denotes the transformer for performing voltage conversion and implementing physical communication between the first image forming apparatus 109 and the first LAN 101, 213 denotes the printing portion for printing the image on the printing paper which is the record medium, and 214 denotes the output processing portion for performing the processes such as gamma conversion, edge enhancement and smoothing in order to correct the image data sent by the main controller portion to be the data suitable for printing on the printing paper.

215 denotes the PWM portion for converting the image data after the output processing into a signal for driving a laser beam, and 216 denotes the printer portion for printing the image on the printing paper based on the signal provided by the laser beam. 217 denotes the ejection portion for ejecting the printed printing paper created by the printing portion 213 to the outside of the image forming apparatus 109, 218 denotes the I/O portion for performing communication between the ejection portion 217 and the main controller portion 201, 219 denotes the controller portion for controlling the ejection portion 217, 220 denotes the paper sensor portion for supervising the flow of the printing paper passing through the inside of the ejection portion 217, 221 denotes the feed motor driving portion for driving the motor for delivering the printing paper, and 222 denotes the tray motor driving portion for driving the ejection tray, and 223 denotes the paper pass controlling portion for controlling the flow of the printing paper.

Figure 4:
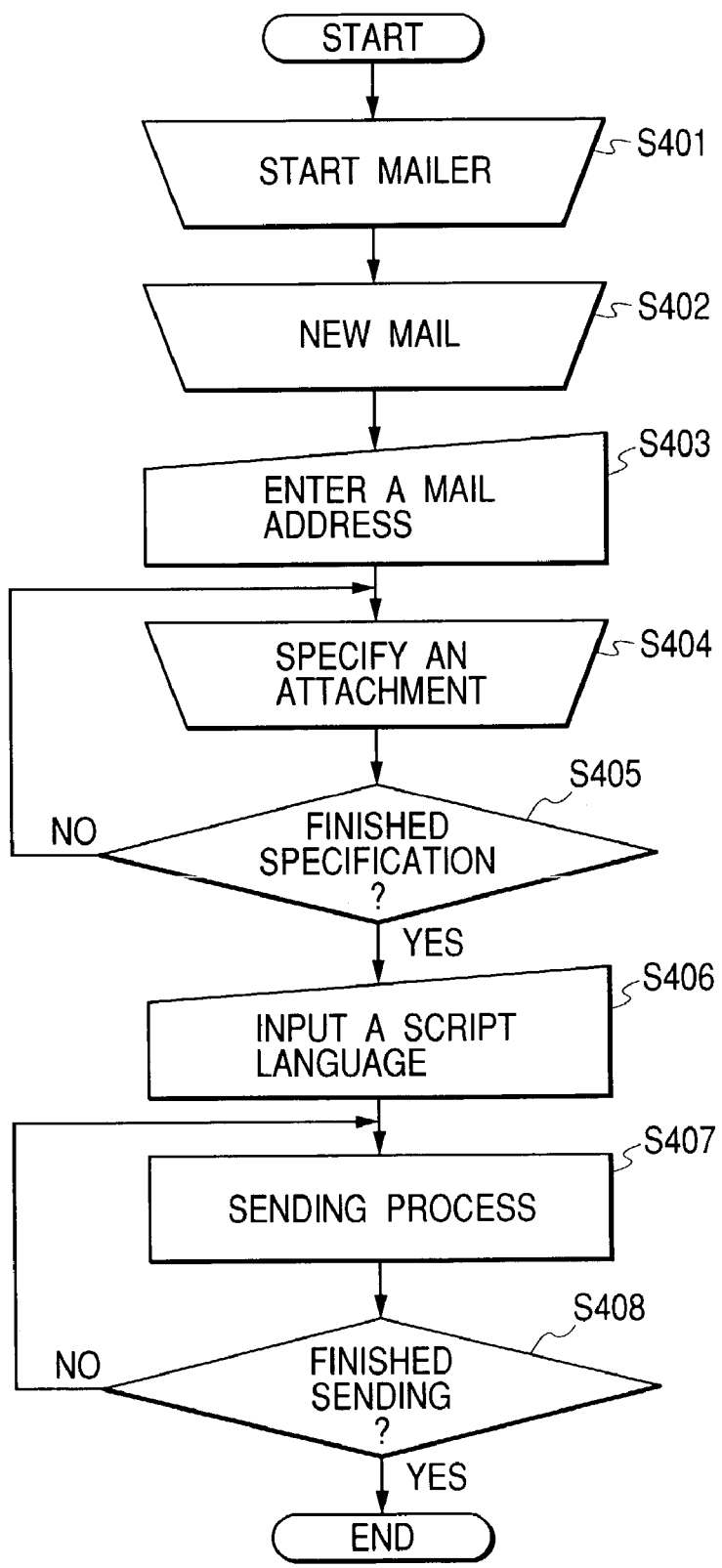
FIG. 4 is a flowchart showing processing of a printing client according to an embodiment of the present invention.
Figure 6:
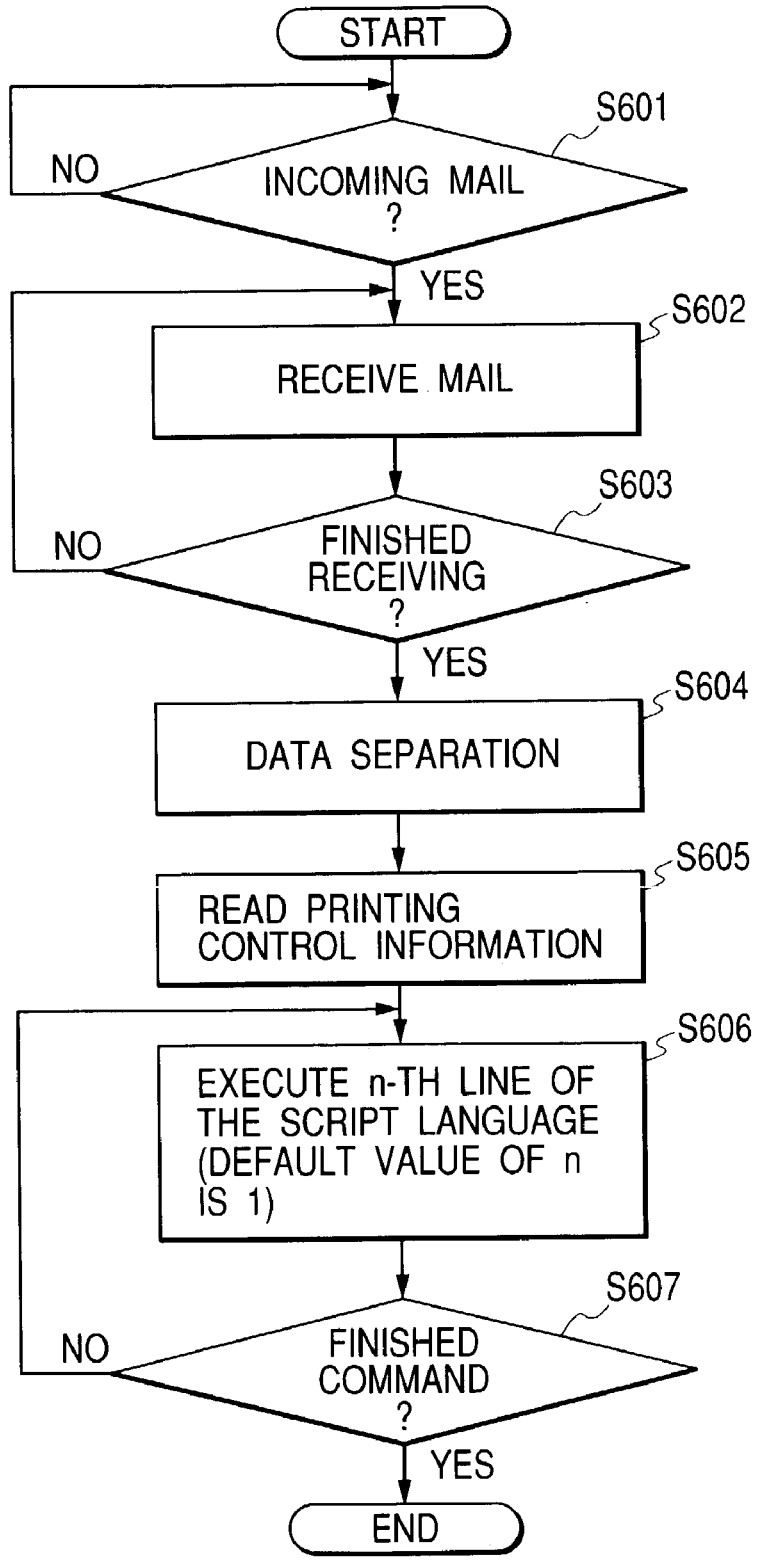
FIG. 6 is a flowchart showing a processing overview of the image forming apparatus according to the embodiment of the present invention.

The operation and communication mode of the image forming system according to the present invention will be described by using the above-mentioned FIGS. 1 and 2 and the flowcharts in FIGS. 4 and 6.

First, the procedure by which the printing clients 104 and 105 send the image data to the image forming apparatus 109 will be described by using the flowchart in FIG. 4.

The printing clients 104 and 105 are the computer apparatuses having the function of connecting to the first LAN 101 by means of the NIC (Network Interface Card) and so on, and has the image data to be printed stored in the storage medium and so on. The operator operates the printing clients 104, and starts e-mail creation software called a mailer in a step S401.

Figure 3:
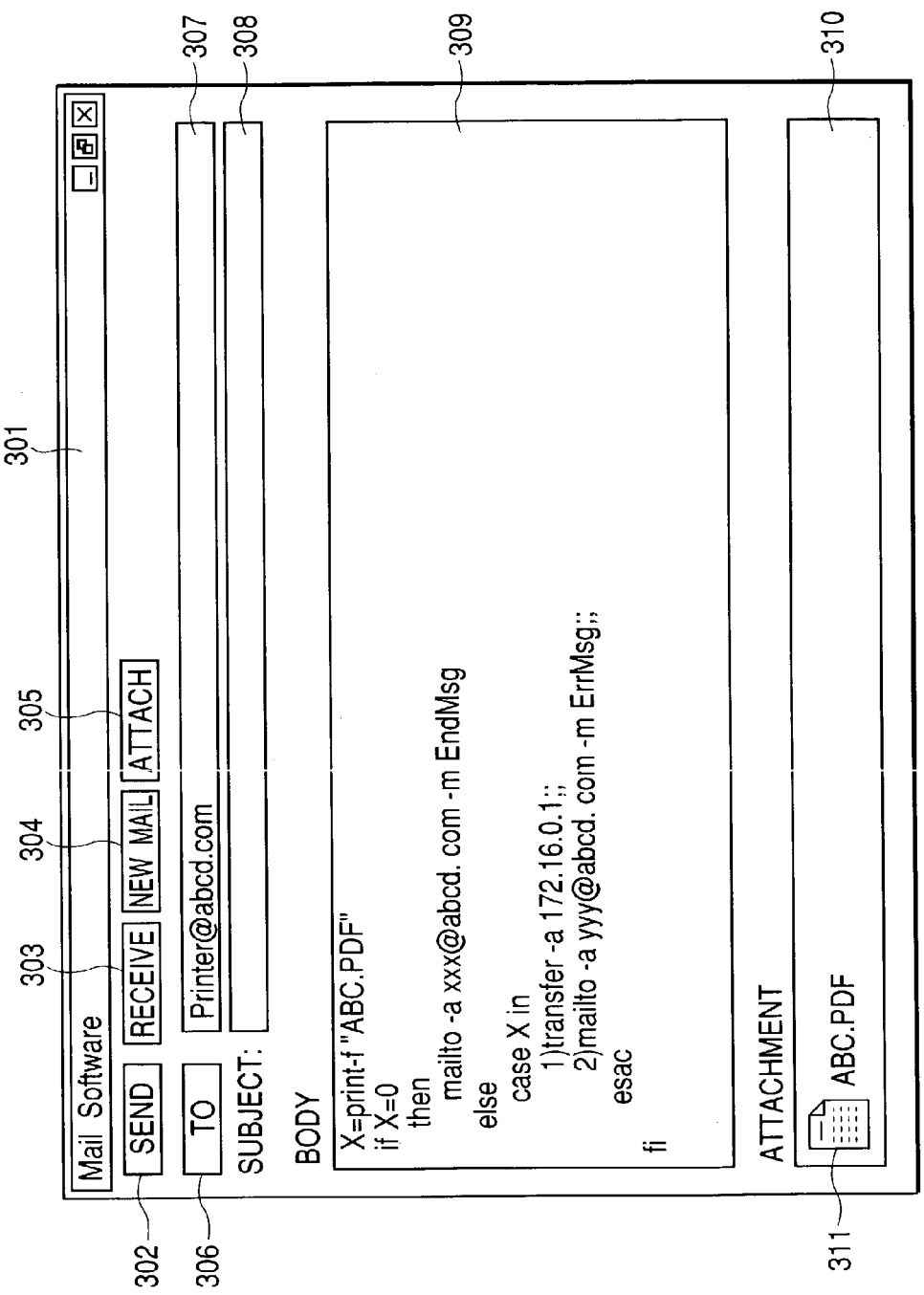
FIG. 3 is a diagram showing a GUI screen by a mailer.

FIG. 3 shows the GUI implemented by the mailer installed on the printing clients 104 and 105. In FIG. 3, reference numeral 301 denotes the window screen of the mailer, 302 denotes a sending button for sending the e-mail, 303 denotes a receiving button for receiving the e-mail, 304 denotes a new mail button for newly creating the e-mail, 305 denotes an attachment button for attaching the file of the image data and so on to the e-mail, 306 denotes a mail address button for referring to an address book storing destinations of the e-mail, 307 denotes an editing box for entering the destination of the e-mail, 308 denotes the editing box for entering a subject of the e-mail, 309 denotes a text box for entering the body of the e-mail, 310 denotes a window for graphically displaying the attached file, and 311 denotes an icon and a file name indicating the file attached to the e-mail.

The operator presses the new mail button 304 of the mailer to instruct it to newly create the e-mail in a step S402, and subsequently enters the destination in the editing box 307 in a step S403. The destination specified here is the e-mail address corresponding to the image forming apparatus 109 intended to send the image data and perform the printing. Such an e-mail address is generally registered in the address book which the mailer has, and it is also possible to call the address book by using the mail address button 306 and selectively specify it by using a mouse and so on.

Subsequently, the operator presses the attachment button 305 in order to select the image data to be printed by the image forming apparatus 109 in a step S404. If the attachment button 305 is pressed, the mailer displays a list of the files of the image data and so on stored in the storage medium of the printing client 104, and displays the GUI for prompting the operator to select the file to be attached. As it is also possible to select a plurality of the attached files, the mailer verifies the end of the attached file specification in a step S405, and repeats the steps S404 and S405 until the operator finishes the specification of the attached file. Moreover, the file attached here is graphically displayed on the window 310 with the icon 311 and the file name thereof. In the case where it is determined that the specification of the attached file is finished the step S405, the operator enters the script for the printing and ejection processes in the text box 309 in a step S406.

Here, FIG. 5 shows a command format which can be entered by the operator.

In FIG. 5, reference numeral 501 denotes a string describing a command, 502 denotes a string describing an option for the command, 503 denotes a string describing an argument for the command option, and 504 denotes a string describing a description of each command and argument.

Reference numeral 505 denotes a line for describing the command for "printing the attached file specified by the argument," where a specific description is given as follows.
  print -f "ABC.PDF"
Reference numeral 506 denotes a line for describing the command for "printing all the attached files," where the specific description is given as follows.
  print -all
Reference numeral 507 denotes a line for describing the command for "transferring the image data to the printer specified by the argument," where the specific description is given as follows.
  transfer -a 172.16.0.1
  transfer -a printer2.abcd.com
Reference numeral 508 denotes a line for describing the command for "transferring the image data which could not be printed to the printer specified by the argument," where the specific description is given as follows.
  transfer -e 172.16.0.1
  transfer -e printer2.abcd.com
Reference numeral 509 denotes a line for describing the command for "sending the e-mail to the e-mail address specified by the argument," where the specific description is given as follows.
  mailto -a xxx@abcd.com
Reference numeral 510 denotes a line for describing the command for "sending a printing completion message by e-mail," where the specific description is given together with a -a option (e-mail destination information) as follows.
  mailto -a xxx@abcd.com -m EndMsg
Reference numeral 511 denotes a line for describing the command for "sending an error message by e-mail," where the specific description is given together with the -a option (e-mail destination information) as follows.
  mailto -a yyy@abcd.com -m ErrMsg
Reference numeral 512 denotes a line for describing the command for "sending a character string specified by the argument by e-mail," where the specific description is given together with the -a option (e-mail destination information) as follows.
  mailto -a zzz@abcd.com -m "Please add papers."
Reference numeral 513 denotes a line for describing the command for "storing the attached file specified by the argument in the storage medium," where the specific description is given together with a -f option (file name information) as follows
  put -f "ABC.PDF"
Reference numeral 514 denotes a line for describing the command for "specifying a BOX number for storing the file," where the specific description is given together with a -n option (BOX number information) as follows
  put -f "ABC.PDF" -n 10
Reference numeral 515 denotes a line for describing the command for "specifying a password for reading the stored file," where the specific description is given together with a -p option (password information) as follows
  put -f "ABC.PDF" -n 10 -p xyz0123
As described above, the option for each command has a hyphen by which it can be distinguished. In addition, condition branching commands such as an if commands and a "case command" can also be used, but description thereof will be omitted here because they use the commands generally used when describing a shell script of UNIX (trademark)—OS.

An example of the script described by the operator according to the command format in FIG. 5 is described in the text box 309 of the mailer shown in FIG. 3. The contents of this description example will be described by using the flowchart in FIG. 7.

The first line of the text box 309 has a printing instruction of the attached file "ABC.PDF" described therein by a print command (step S701). Moreover, at this time, a variable X has a returned value as a result of executing the print command set therein. Here, the returned values are defined as follows.

X=0: Normal end of printing
X=1: Printer is offline
X=2: Jam occurred during printing The above returned value is checked in the second line onward of the text box 309 (step S702), and in the case where the printing is successful, the e-mail for notifying xxx@abcd.com of the normal end of the printing is sent as described in the fourth line of the text box 309 (step S703).

In the case where it is determined in the step S702 that the printing has not come to the normal end, it is subsequently checked whether or not the printer is offline (step S704). It provides an instruction in the seventh line of the script language, if determined to be offline here, to transfer the received e-mail to the image forming apparatus having an IP address of 172.16.0.1 which is a replacement printer so as to print it on behalf thereof (step S705).

In the case where it is determined in the step S704 that the printing is not offline, it is subsequently checked whether or not a paper jam occurred during the printing and the printing was interrupted (step S706). It provides an instruction in the eighth line of the script language, if determined that the paper jam occurred, to send the e-mail for notifying yyy@abcd.com which is a manger of the image forming apparatus 109 of the occurrence of the abnormality on the image forming apparatus 109 (step S707).

In the case where it is determined in the step S706 that no paper jam occurred, it is terminated with no process performed in this example.

Thus, in the case where the image forming apparatus (including a laser printer, an ink jet printer, a facsimile apparatus, a copying machine and a complex machine thereof) according to the present invention is in an unprintable state, that is, when the image forming apparatus is offline or when the jam occurs therein, the e-mail includes as the script either the command for providing the instruction to transfer the attached file to another image forming apparatus to have it printed or the command for providing the instruction to send the e-mail to the image forming apparatus requested to perform the printing.

Figure 7:
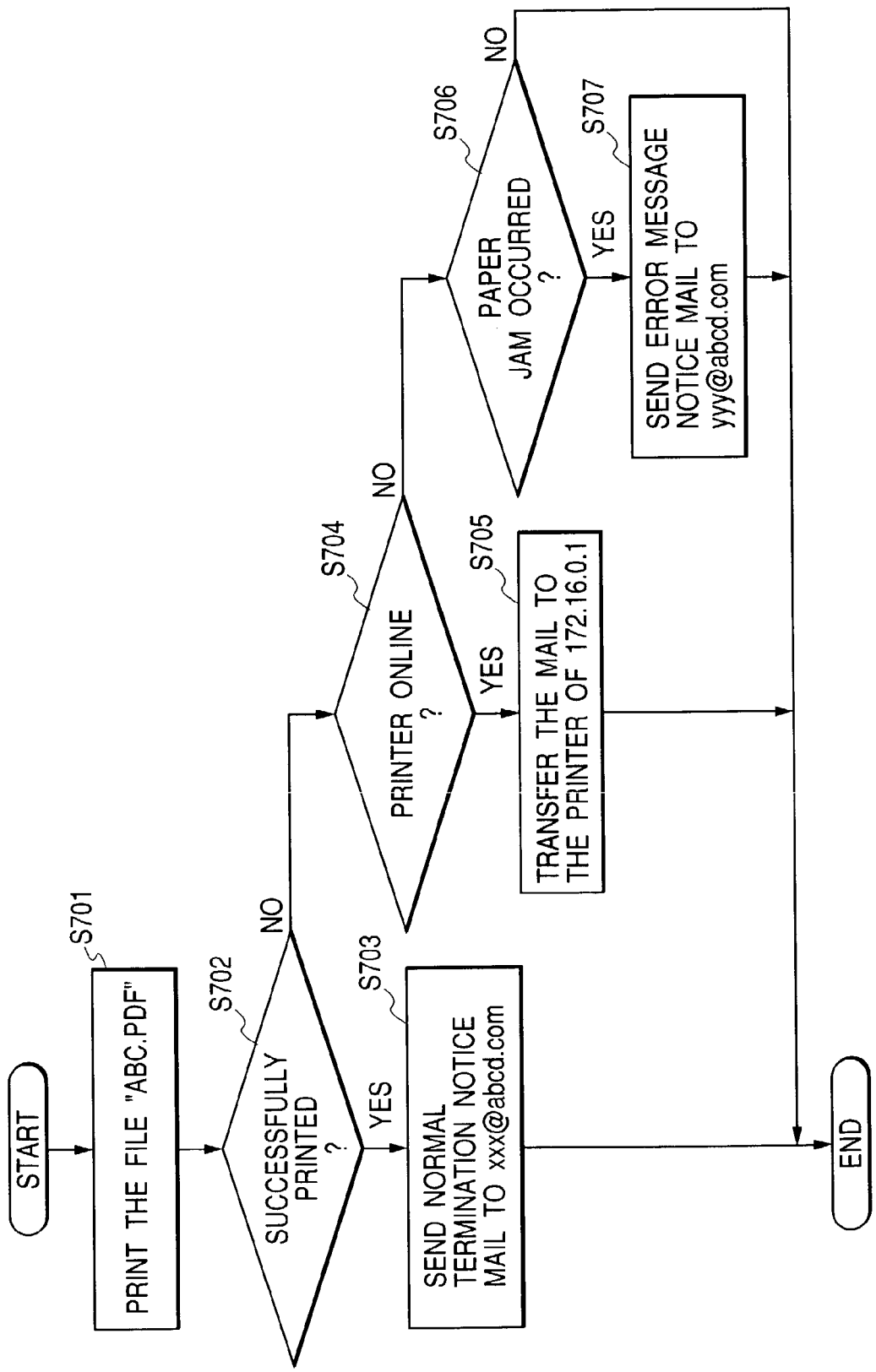
FIG. 7 is a flowchart showing a process based on a script described in a text box on the GUI screen in FIG. 3.

While an example of a script language description was briefly described by using FIGS. 3 and 7 here, it is needless to say that the script language descriptions according to various conditions are possible, depending on a status which can be recognized by the image forming apparatus 109 and the state of the error, such as having run out of the paper, having no paper of the specified size, having no paper of the specified type, the printer being busy, having run out of the toner and not supporting the specified finishing method.

Thus, if the sending button 302 is pressed after describing the script language for providing the instruction in the procedure of the image forming apparatus 109 in the body portion of the mailer, an e-mail sending process is started from the printing client 104 in a step S407. The mailer determines whether or not sending of all the e-mail data is finished in a step S408, and repeats the steps S407 and S408 until the sending is finished. If it is determined that the sending of all the e-mail data is finished in the step S408, the mailer finishes the process.

The e-mail data thus sent from the printing client 104 is once taken in the server apparatus 106 just performing the SMTP service, and then the e-mail is delivered by the function of an SMTP server. At this time, a domain is identified by a DNS server based on the mail address entered by the operator in the step S403 so that the e-mail is sent to the specified destination. As the image forming apparatus 109 is specified as the e-mail destination in this embodiment, the e-mail data sent from the server apparatus 106 is taken in a mail box in a server apparatus 110 installed in the same domain as the image forming apparatus 109 by the SMTP service being performed in the server apparatus 110 by way of a router 102, the Internet 103 and a router 108.

Figure 8:
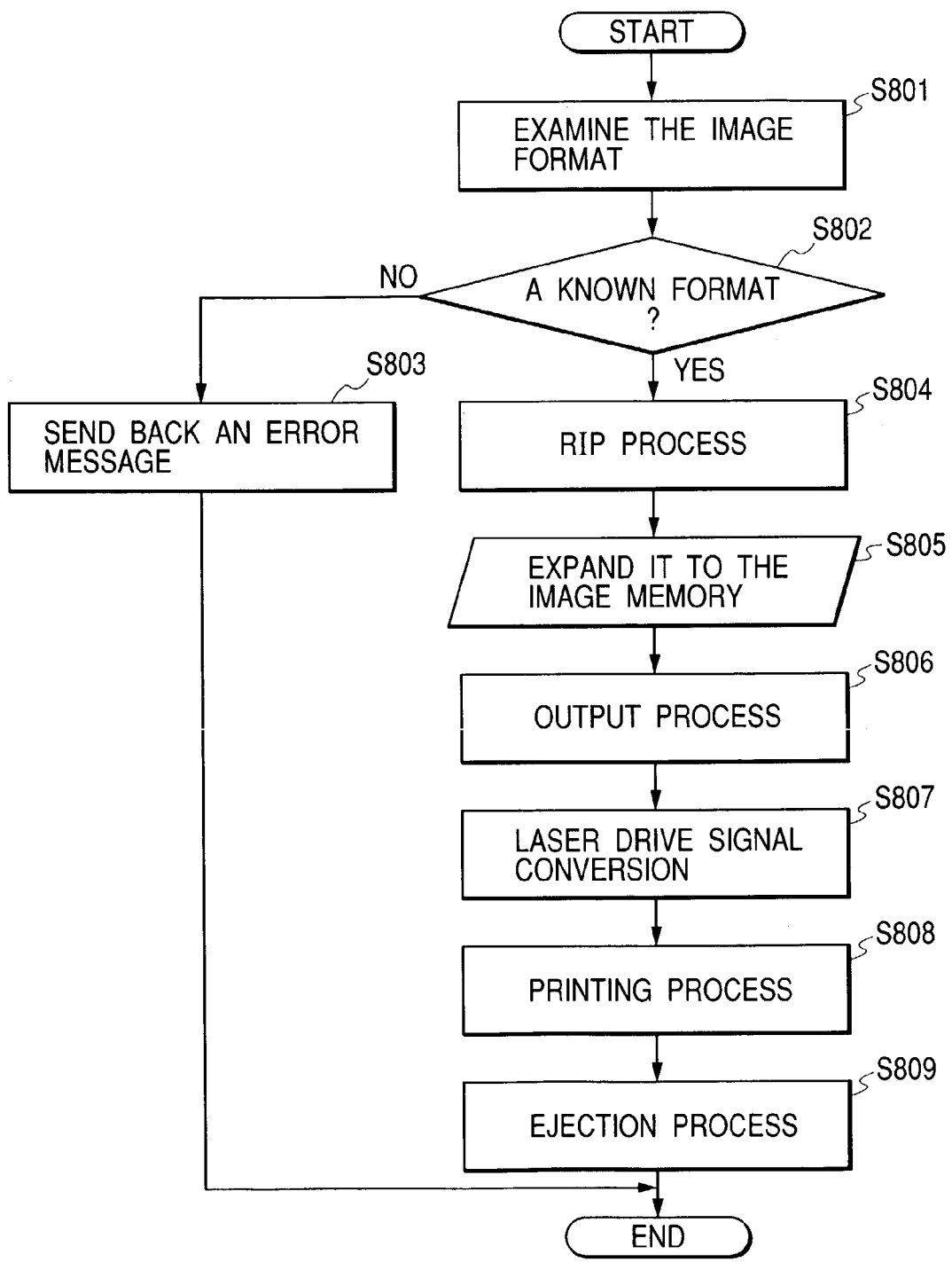
FIG. 8 is a flowchart showing details of a printing process of the image forming apparatus in a step S606 in FIG. 6.

Subsequently, the procedure by which the image forming apparatus 109 receives the e-mail sent from the printing client 104 and performs the process according to the procedure described in the e-mail body will be described by using the flowcharts in FIGS. 6 and 8.

The image forming apparatus 109 periodically checks with the server apparatus 110 as to whether or not the e-mail addressed to it has arrived in a step S601. As the server apparatus 110 has the POP (Post Office Protocol) service performed, the image forming apparatus 109 can send a user ID and a password thereto by using the POP so as to check whether or not the e-mail has arrived in its mail box.

In the case where the e-mail has arrived, the main controller 201 of the image forming apparatus 109 receives the e-mail data from the server apparatus 110 by using the POP in a step S602 by way of the expansion bus 209, the NIC portion 210 and the second LAN 107, and checks whether or not receiving of all the e-mail data is finished in a step S603. In the case where the receiving has not been finished yet, it repeatedly performs the steps S602 and S603.

Thus, if it is determined that the receiving of all the e-mail data is finished in the step S603, the process of dividing the received e-mail data into three blocks of a header portion, the body portion and an attached file portion is subsequently performed in a step S604.

The e-mail is generally constituted in a message format compliant with the MIME (Multipurpose Internet Mail Extensions) standard, and the e-mail data to which the file is attached is constituted as a multipart type, wherein a unique character string indicating a boundary with a boundary parameter of a content-type field is supplied to the boundary of each block, so that it is possible to easily separate the body portion of the e-mail from the attached file portion by searching this character string.

Figure 18:
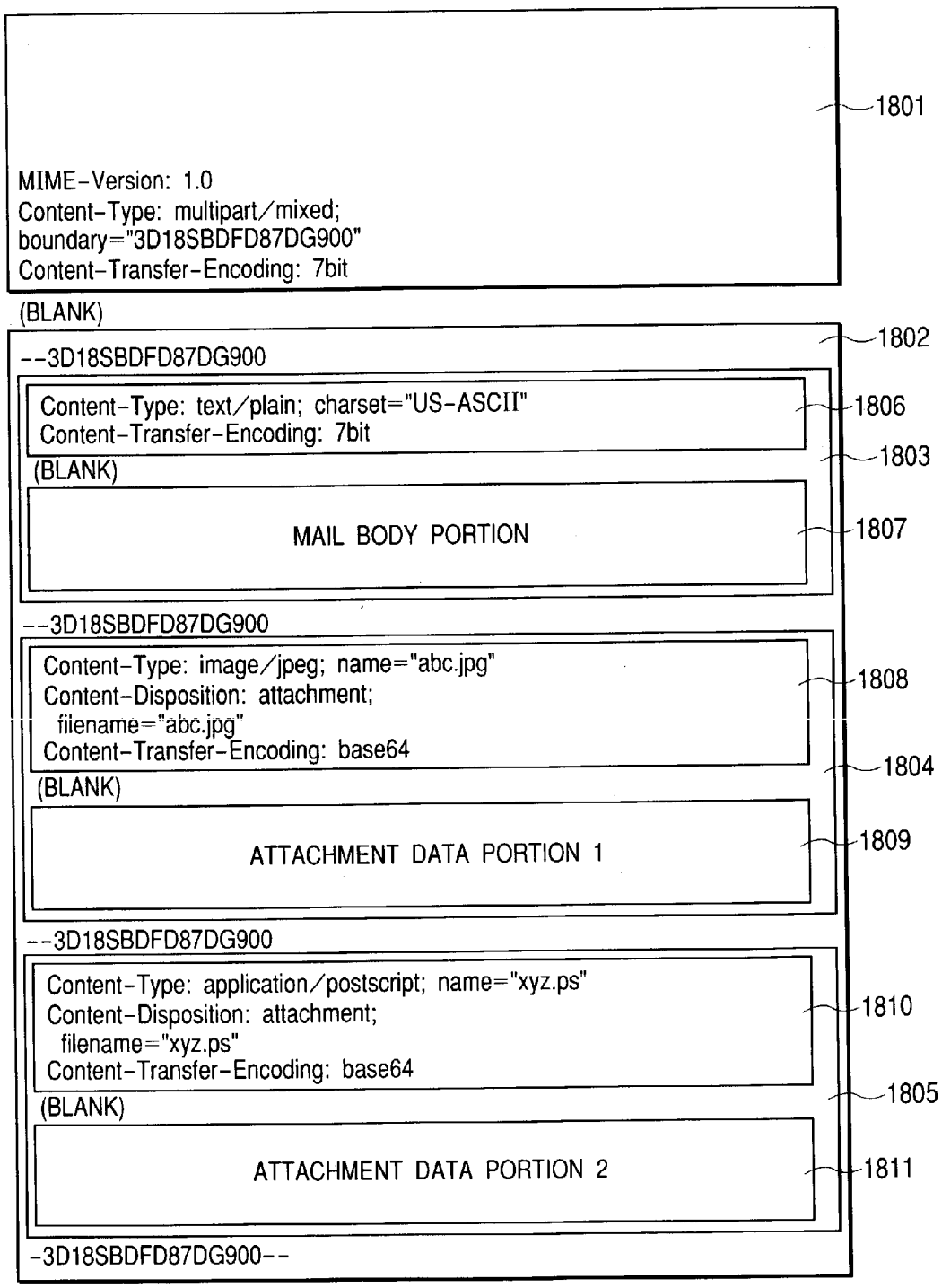
FIG. 18 is a data structure of e-mail created in a MIME format.

FIG. 18 shows a data structure of the e-mail created in a MIME format. Reference numeral 1801 denotes the header portion of the e-mail, 1802 denotes the body portion thereof, 1803 denotes a first part, 1804 denotes a second part, 1805 denotes a third part, 1806 denotes a MIME header related to the first part 1803, 1807 denotes the mail body portion, 1808 denotes the MIME header related to the second part 1804, 1809 denotes a first attached file data portion, 1810 denotes the MIME header related to the third part 1805, and 1811 denotes a second attached file data portion.

Although the e-mail header portion 1801 includes various kinds of information necessary for sending and receiving of the e-mail, it will be described here by limiting it to the information related to the MIME, and the description of the other header information will be left out.

MIME-Version: 1.0

The above header information indicates that a MIME version number is 1.0.

Content-Type: multipart/mixed;

The above header information is the header indicating an attribute of the body portion 1802, and indicates that the body of this e-mail is comprised of multiple parts.

boundary="3D18SBDFD87DG900"

The above header information is a definition of a unique and arbitrary character string called a boundary parameter, and the character string defined here is used to show the boundary of each part.

Content-Transfer-Encoding: 7 bit

The above header information is the header indicating a data storage method, and indicates that the body portion 1802 is originally a 7-bit text code.

As the header portion 1801 and the body portion 1802 of the e-mail are separated by an empty line, it is possible to separate the header portion 1801 from the body portion 1802 by detecting this empty line.

The body portion 1802 of the e-mail is constituted by the three parts comprised of the first part 1803 in which the mail body is described, the second part 1804 in which the first attached file is described, and the third part 1805 in which the second attached file is described. Each part is separated by the character string defined as the boundary parameter and two consecutive hyphen characters added before the character string, and in addition, the end of the multipart is indicated by the character string defined as the boundary parameter and the two consecutive hyphen characters added before and after the character string.

The MIME header 1806 is the header information on the first part 1803, which has the following information on the mail body portion 1807 described therein.

Content-Type: text/plain; charset="US-ASCII"

The above header information indicates that the mail body portion 1807 is described in a general text file and that the character code used therein is US-ASCII.

Content-Transfer-Encoding: 7 bit

The above header information indicates that the body portion 1807 is encoded by the 7-bit text code.

As the MIME header 1806 of the first part 1803 is separated from the mail body portion 1807 by the empty line, it is possible to separate the MIME header 1806 from the mail body portion 1807 by detecting this empty line.

The MIME header 1808 is the header information on the second part 1804, which has the following information on the first attached file data portion 1809 described therein.

Content-Type: image/jpeg; name="abc.jpg"

The above header information indicates that the first attached file data portion 1809 is jpeg-encoded image data and the file name is "abc.jpg."

Content-Disposition: attachment; filename="abc.jpg"

The above header information is used for the purpose of indicating a file attribute and so on, and indicates that the file name of the first attached file is "abc.jpg" here.

Content-Transfer-Encoding: base64

The above header information indicates that the first attached file data portion 1809 is encoded in a Base64 format.

As the MIME header 1808 of the second part 1804 is separated from the first attached file data portion 1809 by the empty line, it is possible to separate the MIME header 1808 from the first attached file data portion 1809 by detecting this empty line.

The MIME header 1810 is the header information on the third part 1805, which has the following information on the second attached file data portion 1811 described therein.

Content-Type: application/postscript; name="xyz.ps"

The above header information indicates that the second attached file data portion 1811 is PDL language data described by PostScript (trademark) of Adobe Systems and the file name is "xyz.ps."

Content-Disposition: attachment; filename="xyz.ps"

The above header information is used for the purpose of indicating a file attribute and so on, and indicates that the file name of the second attached file is "xyz.ps" here.

Content-Transfer-Encoding: base64

The above header information indicates that the second attached file data portion 1811 is encoded in the Base64 format.

As the MIME header 1810 of the third part 1805 is separated from the second attached file data portion 1811 by the empty line, it is possible to separate the MIME header 1810 from the second attached file data portion 1811 by detecting this empty line.

Figure 19:
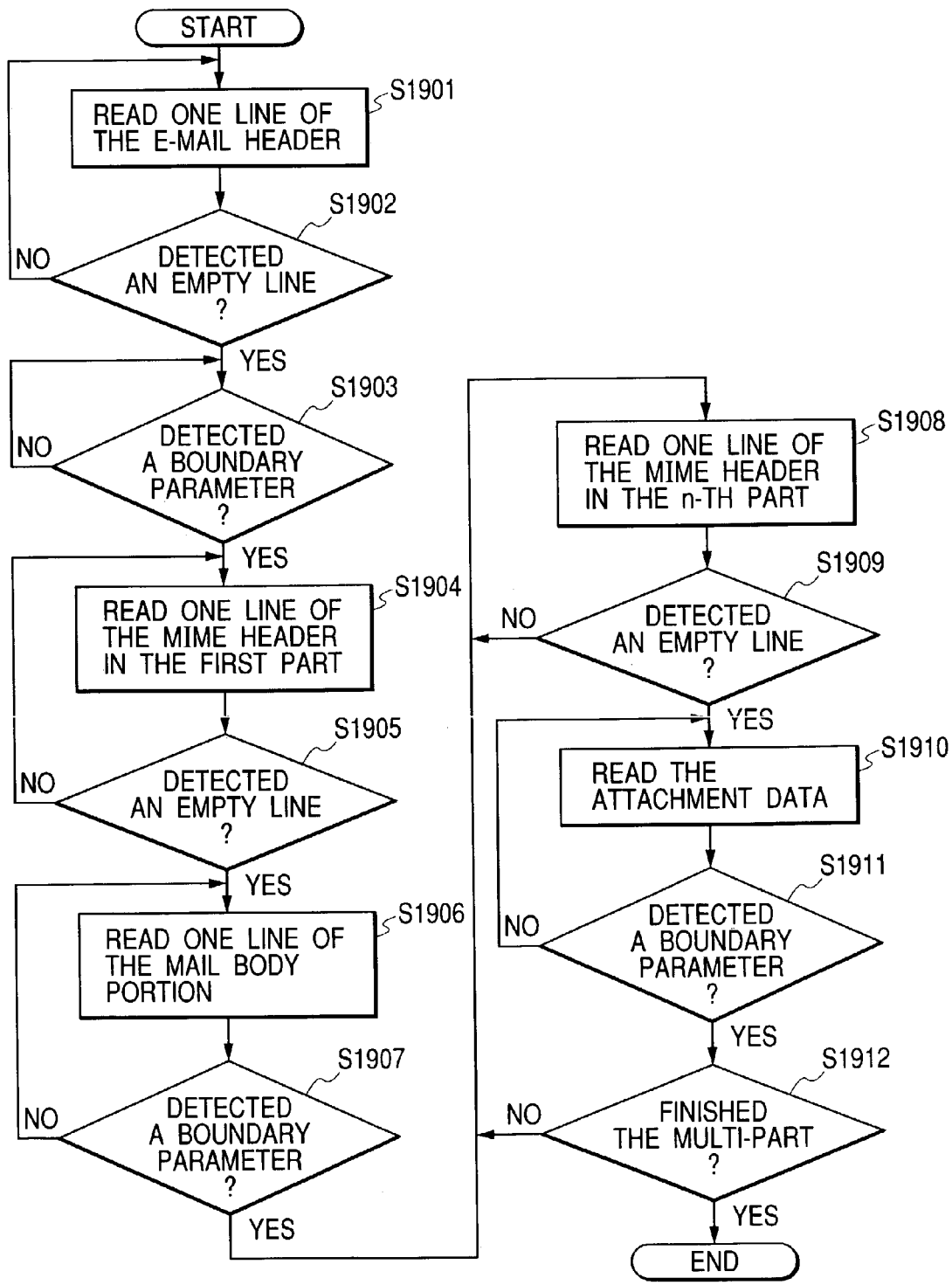
FIG. 19 is a flowchart representing the process for separating e-mail data in the MIME format into a header portion, the body portion and an attached file portion and extracting them.

FIG. 19 is a flowchart representing the process for separating e-mail data in the MIME format into the header portion, the body portion and the attached file portion and extracting them.

The received e-mail data is read line by line from the head by the main controller portion 201. As the e-mail header portion 1801 is described at the head of the e-mail data, the main controller portion 201 first reads the e-mail header (S1901), and stores necessary information in the storage area such as the HDD portion 207 and an RAM not shown as required. In addition, the main controller portion 201 recognizes, from a Content-Type parameter described in the e-mail header portion 1801, that this e-mail data is comprised of multiple parts including the attached files, and further recognizes the character string indicating the boundary of each part from the boundary parameter. The reading of the e-mail header is performed until the empty line indicating the end of the e-mail header is detected (S1902), and if it is detected, the character string defined by the boundary parameter indicating the start of the first part is detected next (S1903).

If this character string is detected in the step S1903, the subsequent MIME header 1806 of the first part 1803 is read line by line by the main controller portion 201 (S1904). The main controller portion 201 recognizes, from the Content-Type parameter described in the MIME header, that the character code used in the mail body portion 1807 included in the first part 1803 is the US-ASCII, and further recognizes, from the Content-Transfer-Encoding parameter, that the mail body portion 1807 is encoded by the bit text code. The reading of the MIME header 1806 is performed until the empty line indicating the end of the MIME header is detected (S1905), and if it is detected, the process of reading the mail body portion 1807 line by line is subsequently performed (S1906) so that the data of the mail body read here is temporarily stored in the storage area such as the RAM not shown. The process of reading the mail body portion 1807 is performed until the character string defined by the boundary parameter indicating the boundary between the first part 1803 and the second part 1804 is detected (S1907).

If this character string is detected in the step S1907, the subsequent MIME header 1808 of the second part 1804 is read line by line by the main controller portion 201 (S1908). The main controller portion 201 recognizes, from the Content-Type parameter described in the MIME header, that the first attached file data portion 1809 included in the second part 1804 is jpeg-encoded image data and the file name is "abc.jpg," and further recognizes, from the filename parameter of Content-Disposition, that the file name of the attached file is "abc.jpg," and further recognizes, from the Content-Transfer-Encoding parameter, that the first attached file data portion 1809 is encoded in the Base64 format. The reading of the MIME header 1808 is performed until the empty line indicating the end of the MIME header is detected (S1909), and if it is detected, the process of reading the attached file data is subsequently performed (S1910) so that the attached file data read here is temporarily stored in the storage area such as the HDD portion 207. The process of reading the first attached file data portion 1809 is performed until the character string defined by the boundary parameter indicating the boundary between the second part 1804 and the third part 1805 is detected (S1911).

If this character string is detected in the step S1911, it is examined whether or not the character string detected here indicates the end of the multiple parts (S1912). In the example in FIG. 18, as it is the e-mail data having two attached files, it is determined not to be the end of the multiple parts in the step S1912, so that it returns to the step S1908 and the MIME header 1810 of the third part 1805 is read line by line by the main controller portion 201. The main controller portion 201 recognizes, from the Content-Type parameter described in the MIME header, that that the second attached file data portion 1811 included in the third part 1805 is the page description language described by PostScript (trademark of Adobe Systems) and the file name is "xyz.ps," and recognizes, from the filename parameter of Content-Disposition, that the file name of the attached file is "xyz.ps," and further recognizes, from the Content-Transfer-Encoding parameter, that the second attached file data portion 1811 is encoded in the Base64 format. The reading of the MIME header 1810 is performed until the empty line indicating the end of the MIME header is detected (S1909), and if it is detected, the process of reading the attached file data is subsequently performed (S1910) so that the attached file data read here is temporarily stored in the storage area such as the HDD portion 207. The process of reading the second attached file data portion 1811 is performed until the character string defined by the boundary parameter is detected (S1911), and if the two consecutive hyphens are detected at the end of the character string, the end of the multiple parts is recognized (S1912) so as to finish a separation process of the e-mail data.

The mail body portion 1807 thus separated is read as the script language to the image forming apparatus 109 in a step S605, and thereafter, the process of the image forming apparatus 109 is performed according to the described procedure. First, the first line of the script language is performed in a step S606, and the instruction is processed according to the contents of the described command, and thereafter, it is repeated until the end of the command is determined in a step S607 so as to finish the process when all the execution of the command is finished.

Next, the details of the step S606 will be described by using the flowchart in FIG. 8. In the case of executing a command 505 for "printing the attached file specified by the argument" in the step S606, the file name of the attached file is supplied by the argument of the command, and so it is possible to identify the image format by examining an extension of the file name supplied here or by the medium type supplied by the aforementioned Content-Type parameter included in the MIME header portion.

On the other hand, in the case of executing a command 506 for printing all the attached files, it is also possible to recognize the image format and the data format of the attached file by the medium type supplied by the aforementioned Content-Type parameter included in the MIME header portion.

As a result of this, it is determined whether or not the image data received by the attached files is in a known image format capable of expanding on the image forming apparatus 109 in a step S802, and if it is determined not to be the known image format as a result of the determination, the image forming apparatus 109 sends back the e-mail describing the error message to the printing client 104, the sender of the e-mail (step S803), and finishes the process. This error message has a description in the e-mail body to the effect that it is the image format incapable of being processed by the image forming apparatus 109.

In addition, in the case where it is determined to be the known image format in the step S802, it is in a state of each image format data at this stage and cannot be handles as the printing data as-is, and so the image data is decoded by the main controller portion 201, and thereafter, the RIP (Raster Image Processing) process is performed to convert the image data into the raster image data in a step S804.

The data which has thus become the raster image data is once expanded to an image memory 208 in a step S805, and the output processes such as the gamma conversion, edge enhancement and smoothing are performed thereto by the output processing portion 214 of the printing portion 213 in order to correct it to be the data suitable for printing on the printing paper (step S806). The image data which has been thus converted into the data suitable for printing is converted into the laser driving signal by the PWM portion 215 (step S807) and then sent to the printer portion 216.

In the printer portion 216, the printing process for printing the image from the laser driving signal to the printing paper (step S808) is performed. This printing process will be described in detail by using the sectional view showing the mechanical configuration of the black and white image forming apparatus in FIG. 9.

In FIG. 9, 5213 denotes the polygon mirror, which receives the laser beam. The laser beam is irradiated to the photoconductive drum 5217 via the mirrors 5214, 5215 and 5216, and scans the photoconductive drum 5217 by rotation of the polygon mirror 5213. On the other hand, 5230 denotes the development apparatus for supplying the black toner, forms the toner image on the photoconductive drum 5217 according to the laser beam, and the toner image is transcribed to the printing paper so that the output image can be obtained.

The printing paper fed by one of the paper cassettes 5234 and 5235 and the manual tray 5236 is absorbed on the transcription belt 5238 and carried by way of the resist roller 5237. A toner is developed in the photoconductive drum 5217 in advance in synchronization with the timing of the feed, and the toner is transcribed to the printing paper in conjunction with carriage thereof. The printing paper to which the toner is transcribed is separated from the transcription belt 5238, and the toner is fixed on the printing paper by the fixing apparatus 5240 so as to be ejected to the outside of the image forming apparatus 109 by the ejection roller 5242.

In the case of printing on both sides, however, the printing paper is carried to the ejection roller 5242, and then the rotating direction of the ejection roller 5242 is reversed so as to have it led to a refeed carriage route by the flapper 5241. In addition, in the case of performing multiple recording, the printing paper is led to the refeed carriage route by the flapper 5241 so as not to carry it to the ejection roller 5242. The printing paper led to the refeed carriage route is fed from the resist roller 5237 in the in the above-mentioned timing so that the process of printing the image on the printing paper is performed again.

If the printing process of the image data is thus finished, the printed printing paper is sent to the ejection portion 5517, where the ejection process (step S809) is performed. The ejection portion 5517 controls various ejection processes as the controller portion 5519 for controlling the ejection apparatus performs the communication with the main controller 5501 via the I/O portion 5518. On the other hand, the controller portion 5519 delivers the printing paper by using the feed motor driving portion 5521, controls the flow of the printing paper by using the paper pass controlling portion 5523, and controls the tray motor driving portion 5522 to eject the printing paper to an arbitrary tray while supervising the flow of the printing paper by using the paper sensor portion 5520.

FIG. 10 is a sectional view showing the mechanical configuration of the ejection apparatus.

In FIG. 10, 5301 denotes the sample tray, 5302 denotes the stack tray, and 5308 denotes the booklet tray, where the tray for ejection is switched by the control of the controller portion 5519 according to the type of job and the number of sheets of the printing paper to be ejected.

The stack tray 5302 allows the printing paper before the ejection to be stored for each job and bound by the stapler 5305 immediately before the ejection. In addition, the route through which the printing paper is led to the sample tray 5301 and the stack tray 5302 has the Z folding apparatus 5304 for folding the printing paper like the character Z and the puncher 5306 for punching two or three holes for filing provided thereon, which perform the respective processes according to the type of job.

Moreover, the inserter 5303 is used to perform the insertion function, and the printing paper for the insertion can be placed therein. Furthermore, the saddle stitcher 5307 is used to fold the printing paper in half in the booklet form and bind it at its center. In this case, it is ejected to the booklet tray 5308.

On the other hand, in the case where the command to be executed in the step S606 is a command 507 for "transferring the image data to the printer specified by the argument," the image forming apparatus 109 transfers the e-mail accompanied by the received attached file to the printer specified by the argument so as to request the transferred printer to print it on behalf thereof.

In addition, in the case where the command to be executed in the step S606 is a command 508 for "transferring the image which could not be printed to the printer specified by the argument," the image forming apparatus 109 transfers only the image data which could not be printed, of the image data requested to be printed attached to the e-mail to the printer specified by the argument, so as to request the transferred printer to print it on behalf thereof.

In addition, in the case where the command to be executed in the step S606 is a mail to command, it sends to the e-mail address specified by the argument the e-mail accompanied by the message specified by the subsequent argument. At this time, in the case where the argument is EndMsg, the image forming apparatus 109 sets the message representing "normal end of printing" generated by itself in the body portion of the e-mail, and sends the e-mail to the specified destination.

Likewise, in the case where the argument is ErrMsg, the image forming apparatus 109 sets the message representing "occurrence of a printing error" generated by itself in the body portion of the e-mail, and sends the e-mail to the specified destination, that is, the printing client 104 or 105 which made a printing request. In addition, in the case where a character string is given to the argument, it sets the character string in the body portion of the e-mail, and sends the e-mail to the specified destination.

In addition, in the case where the command to be executed in the step S606 is a put command, it stores the image data having the file name specified by the argument at the BOX number specified by the argument. In that case, the password for the user to read the image data is simultaneously specified by the argument from the BOX specified here. Moreover, the BOX described here is the storage area of the image data generally called a mail box, which is a mechanism provided to a high-capacity storage medium such as the HDD portion 207 for the sake of temporarily storing in the image forming apparatus 109 the data not desired to be immediately outputted to the paper or desired to be reutilized later by the printing client.

According to this embodiment, it has the effect of being able to determine the body of the e-mail and flexibly process the determined e-mail according to the script described in the e-mail. In addition, the user can have various processes automatically performed to the attached file just by describing the instruction in the mail body.

Thus, according to this embodiment, the printing clients 104 and 105 send the data to be printed as the attached file to the e-mail to the image forming apparatus, and the e-mail has the data structure of the header portion, body portion and attached file, where the script indicating the procedure for printing the data stored in the attached file is placed in the body portion.

Thus, it is possible, by sending the data to be printed as the attached file to the e-mail to the image forming apparatus, to send the data to be printed to the image forming apparatus and have it printed thereby even in the case where a client apparatus for requesting the data to be printed and the image forming apparatus for printing the requested data are connected to mutually different networks separated by the router.

To be more specific, as for the routers 102 and 108 connected to the Internet, the port number 25 for the SMTP is generally open to allow the computer apparatuses in the intranet to use the e-mail. For that reason, it is possible, in the printing method using the SMTP protocol according to the present invention, to perform the printing by using the image forming apparatus 109 existing outside the segment related to the router 102 to which the clients apparatuses 104 and 105 belong to in a network environment capable of using the e-mail.

In addition, the e-mail is sent with the script placed in the body portion thereof, as the script for controlling the printing, for the sake of having the contents of the abnormality occurred in the image forming apparatus sent to the printing client by the e-mail, and so it is possible to take appropriate and elaborate countermeasures against the occurrence of abnormality during the printing even in the case of performing the printing from the printing client to the image forming apparatus installed at a physically distant location.

Moreover, the present invention is not limited to the above embodiment, but is also applicable to color image forming apparatuses such as a color printer and a color copying machine in addition to the black and white image forming apparatus.

As described above, according to the present invention, it is possible to send the data from the client apparatus and print it on the image forming apparatus and to provide the instruction from the client apparatus to the image forming apparatus as to how to respond to the end of the printing and occurrence of the abnormality so as to improve convenience.

What is claimed is:

1. An image forming apparatus for printing data requested to be printed from a client apparatus via a network, comprising:

a determination unit adapted for determining whether or not a print instruction string indicating a print instruction for printing of data contained in an attached file to an e-mail sent from the client apparatus and a transfer instruction string indicating a transfer instruction for transfer of the data to another image forming apparatus are described in the body portion of the e-mail;

a controlling unit adapted for, in case where said determination unit determines that the print instruction string and the transfer instruction string are described, controlling printing of the data contained in the attached file and controlling transfer of the data to the other image forming apparatus if the data is not printed, in accordance with the print instruction string and the transfer instruction string; and a notifying unit adapted for, in case where said determination unit determines whether or not a notification instruction string indicating a notification instruction for notification to the client apparatus is described and if said determination unit determines that the notification instruction string is described and if an abnormality has occurred in said image forming apparatus, notifying the client apparatus that the abnormality has occurred in said image forming apparatus.

2. The image forming apparatus according to claim 1, wherein the transfer instruction indicated by the transfer instruction string instructs transfer of the data to the other image forming apparatus if said image forming apparatus is in a print-impossible status described in said body portion.

3. The image forming apparatus according to claim 2, wherein the case where said image forming apparatus in the print-impossible status is the case where said image forming apparatus is offline.

4. The image forming apparatus according to claim 2, wherein the case were said image forming apparatus in the print-impossible status is the case where a paper jam has occurred to said image forming apparatus.

5. The image forming apparatus according to claim 1, wherein said notifying unit notifies that the abnormality has occurred by e-mail.

6. The image forming apparatus according to claim 1, wherein, said determination unit further determines whether or not a storing instruction string indicating a storing instruction to store the data in a storage medium is described, and wherein, if said determination unit determines the storing instruction string is described, said controlling unit controls storing of the data contained in the attached file in accordance with the storing instruction string.

7. The image forming apparatus according to claim 6, wherein the storing instruction string uses one or more of an option of specifying a file name to be stored in the storage medium, an option of specifying an area ID for storing a file, and an option of specifying a password for reading the stored file.

8. The image forming apparatus according to claim 1, wherein the print instruction string uses one of both of an option of specifying a file name of the attached file and an option of providing the instruction to print all the data contained in the attached file.

9. The image forming apparatus according to claim 1, wherein the transfer instruction string uses an option of specifying a transfer destination of the attached file.

10. The image forming apparatus according to claim 1, wherein the notification instruction string uses an option of specifying a destination of the e-mail.

11. The image forming apparatus according to claim 1, wherein the notification instruction string uses one or a plurality of an option of having a message notifying that printing has normally ended sent by the e-mail, an option of having a message notifying that an error has occurred at the beginning stage of or during the printing sent by the e-mail, and an option of having a character string specified by an argument sent by the e-mail.

12. An image forming method carried out in an image forming apparatus for performing an image forming process by making a printing request from a client apparatus via a network, said image method comprising:

determining whether or not a print instruction string indicating a print instruction for printing of data contained in an attached file to an e-mail sent from the client apparatus and a transfer instruction string indicating a transfer instruction for transfer of the data to another image forming apparatus are described in the body portion of the e-mail;

in case where said determination step determines that the print instruction string and the transfer instruction string are described, controlling printing of the data contained in the attached file and controlling transfer of the data to the other image forming apparatus if the data is not printed, in accordance with the print instruction string and the transfer instruction string; and in case where said determination step determines whether or not a notification instruction string indicating a notification instruction for notification to the client apparatus is described and if said image forming apparatus has a notifying step of, in the case where said determination step determines that the notification instruction string is described and where an abnormality has occurred in said image forming apparatus, notifying the client apparatus that the abnormality has occurred in said image forming apparatus.

13. The image forming method according to claim 12, wherein the transfer instruction indicated by the transfer instruction string instructs transfer of the data to the other image forming apparatus if said image forming apparatus is in a print-impossible status.

14. The image forming method according to claim 12, wherein said notifying step notifies by the e-mail that the abnormality has occurred.

15. The image forming method according to claim 12, wherein, said determination step further determines whether or not a storing instruction string indicating a storing instruction string to store the data in a storage medium is described, and wherein if said determination step determines that the storing instruction string described, said controlling step controls storing of the data contained in the attached file in accordance with the storing instruction string.

16. The image forming method according to claim 15, wherein the case where said image forming apparatus is in the print-impossible status is the case where a paper jam has occurred to said image forming apparatus.

17. The image forming method according to claim 15, wherein the print instruction string uses one or both of an option of specifying a file name of the attached file and an option of providing the instruction to print all the data contained in the attached file.

18. The image forming method according to claim 15, wherein the transfer instructio string uses an option of specifying a transfer destination of the attached file.

19. The image forming method according to claim 15, wherein the notification instruction string uses using an option of specifying a destination of the e-mail.

20. The image forming method according to claim 15, wherein the notification instruction string uses using one or a plurality of an option of having a message notifying that printing has normally ended sent by the e-mail, an option of having a message notifying that an error has occurred at the beginning stage of or during the printing sent by the e-mail, and an option of having a character string specified by an argument sent by the e-mail.

21. The image forming method according to claim 17, wherein the storing instruction string uses one or a plurality of an option of specifying a file name to be stored in the storage medium, an option of specifying an area ID for storing a file, and an option of specifying a password for reading the stored file.

22. The image forming method according to claim 12, wherein the case where said image forming apparatus is in the print-impossible status is the case where said image forming apparatus is offline.

23. A control program stored on a computer-readable storage medium, the control program to be executed by an image forming apparatus for printing data requested to be printed from a client apparatus via a network, characterized by having the contents of, as to e-mail sent from said client apparatus, identifying a header portion, the body portion of an attached file, said control program for performing a method comprising:

determining whether or not a print instruction string indicating a print instruction for printing of data contained in an attached file to an e-mail sent from the client apparatus and a transfer instruction string indicating a transfer instruction for transfer of the data to another image forming apparatus are described in the body portion of the e-mail;

in case where said determination step determines that the print instruction string and the transfer instruction string are described, controlling printing of the data contained in the attached file and controlling transfer of the data to the other image forming apparatus if the data is not printed, in accordance with the print instruction string and the transfer instruction string; and in case where said determination step determines whether or not a notification instruction string indicating a notification instruction for notification to the client apparatus is described and if said image forming apparatus has a notifying step of, in the case where said determination step determines that the notification instruction string is described and where an abnormality has occurred in said image forming apparatus, notifying the client apparatus that the abnormality has occurred in said image forming apparatus.

* * * * *

UNITED STATES PATENT AND TRADEMARK OFFICE
CERTIFICATE OF CORRECTION

PATENT NO. : 7,209,965 B2
APPLICATION NO. : 10/308067
DATED : April 24, 2007
INVENTOR(S) : Sato It is certified that error appears in the above-identified patent and that said Letters Patent is hereby corrected as shown below:

SHEET 13:
FIG. 13, "Namber" should read -- Number -- and;
"Cwccent" should read -- Current --.

COLUMN 1:
Line 19, "were" should read -- was --; and
Line 55, "there of." should read -- thereof. --.

COLUMN 13:
Line 58, "finished" should read -- finished in --.

COLUMN 14:
Line 46, "follows" should read -- follows. --;
Line 52, "follows" should read -- follows. --;
Line 57, "follows" should read -- follows. --; and
Line 61, "if commands" should read -- if command --.

COLUMN 15:
Line 32, "manger" should read -- manager --.

COLUMN 20:
Line 17, "handles" should read -- handled --; and
Line 54, "with" should read -- with the --.

COLUMN 23:
Line 42, "were" should read -- where --; and
Line 64, "one of" should read -- one or --.

COLUMN 24:
Line 56, "string" should read -- string is --.

UNITED STATES PATENT AND TRADEMARK OFFICE
CERTIFICATE OF CORRECTION

PATENT NO. : 7,209,965 B2
APPLICATION NO. : 10/308067
DATED : April 24, 2007
INVENTOR(S) : Sato It is certified that error appears in the above-identified patent and that said Letters Patent is hereby corrected as shown below:

COLUMN 25:
Line 2, "instructio" should read -- instruction --;
Line 5, "using" should be deleted;
Line 8, "using" should be deleted; and
Line 15, "claim 17," should read -- claim 15, --.

Signed and Sealed this

Twenty-fifth Day of March, 2008

JON W. DUDAS
*Director of the United States Patent and Trademark Office*